US006526406B1

(12) United States Patent
Suzuki et al.

(10) Patent No.: US 6,526,406 B1
(45) Date of Patent: Feb. 25, 2003

(54) DATABASE ACCESS SYSTEM TO DELIVER AND STORE INFORMATION

(75) Inventors: Kenji Suzuki, Koto-ku (JP); Hideyo Namimoto, Koto-ku (JP); Masataka Kawamoto, Koto-ku (JP)

(73) Assignee: Kawasaki Steel Systems R & D Corporation, Tokyo (JP)

( * ) Notice: Subject to any disclaimer, the term of this patent is extended or adjusted under 35 U.S.C. 154(b) by 344 days.

(21) Appl. No.: 09/585,418

(22) Filed: Jun. 2, 2000

(30) Foreign Application Priority Data

Jun. 7, 1999 (JP) .......................... 11-158924
Dec. 8, 1999 (JP) .......................... 11-349570

(51) Int. Cl.[7] ............................................. G06F 17/30
(52) U.S. Cl. ................................. 707/10; 707/515
(58) Field of Search ................. 707/3, 4, 10, 100, 707/102, 200, 500, 511, 514, 515; 709/203, 227, 328

(56) References Cited

U.S. PATENT DOCUMENTS

| 4,774,661 A | 9/1988 | Kumpati .................. 707/3 |
| 5,754,772 A | 5/1998 | Leaf ...................... 709/203 |
| 5,781,739 A | 7/1998 | Bach et al. .............. 709/227 |
| 6,269,380 B1 * | 7/2001 | Terry et al. ............. 707/1 |
| 6,360,227 B1 * | 3/2002 | Aggarwal et al. ......... 345/428 |
| 6,385,619 B1 * | 5/2002 | Eichstaedt et al. ....... 707/1 |

FOREIGN PATENT DOCUMENTS

| EP | 0-398-650 | 5/1990 |
| JP | A-11-249952 | 9/1999 |
| JP | A-11-265395 | 9/1999 |

* cited by examiner

Primary Examiner—Diane D. Mizrahi
Assistant Examiner—Apu M Mofiz
(74) Attorney, Agent, or Firm—Oliff & Berridge, PLC

(57) ABSTRACT

An elementary data type definition table storage 11 stores the data types of various data stored in a database. A complex data type definition table storage 12 stores definitions of various data masses to be offered to users by using the above data type definitions. A complex/elementary data type relation table 13 stores the complex data type definitions expressed in terms of elementary data type definitions, for each of the definitions of various data masses. Through this arrangement, it becomes possible to build a database which may have various data structures, by only implementing a number of definition tables and not preparing any new programs for those structures, thereby to reduce the time, labor and cost required for the preparation of such programs, and to relieve the database builder of technical knowledge usually required for such database construction.

17 Claims, 54 Drawing Sheets

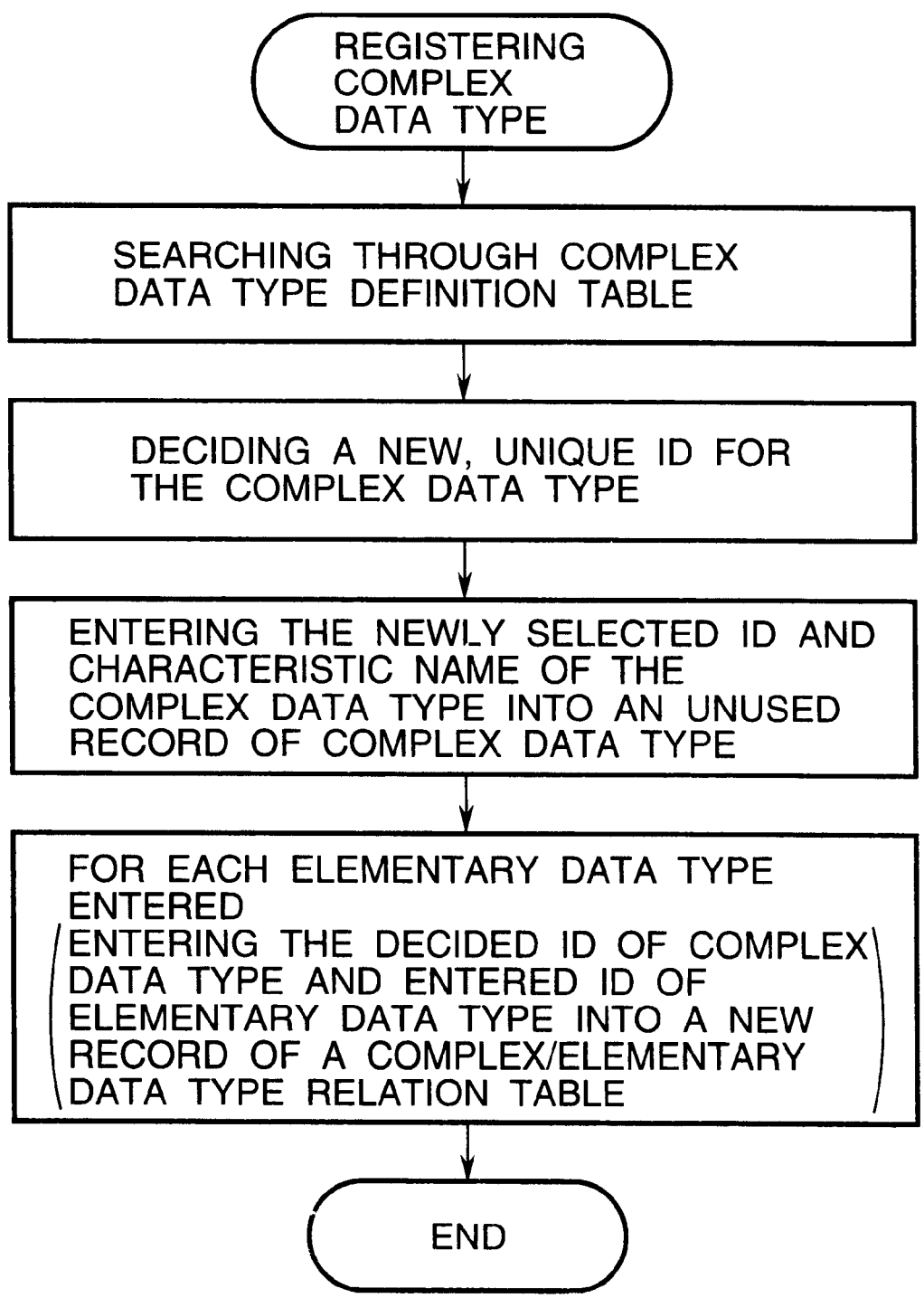

FIG.16

INPUT = ID OF COMPLEX DATA TYPE ( DISPLAY SCREEN PROMPTING THE ENTRY OF COMPLEX DATA )

↓

SEEKING IDS OF ELEMENTARY ATTRIBUTE TYPES CORRESPONDING WITH THE COMPLEX ATTRIBUTE TYPE USING COMPLEX/ELEMENTARY DATA TYPE RELATION TABLE

↓

REPEATEDLY FOR EACH ELEMENTARY ATTRIBUTE TYPE IN THE LIST
( SEEKING, AS THE ELEMENTARY DATA VALUE OF COMPLEX DATA, ELEMENTARY DATA THAT HAVE THE SAME ID WITH THAT OF THE COMPLEX DATA ON AN ELEMENTARY ATTRIBUTE VALUE TABLE )

↓

CREATING A SCREEN DEFINING PROGRAM TO DELIVER OUTPUT TO SERVER HANDING STARTER

↓

( END )

FIG.17

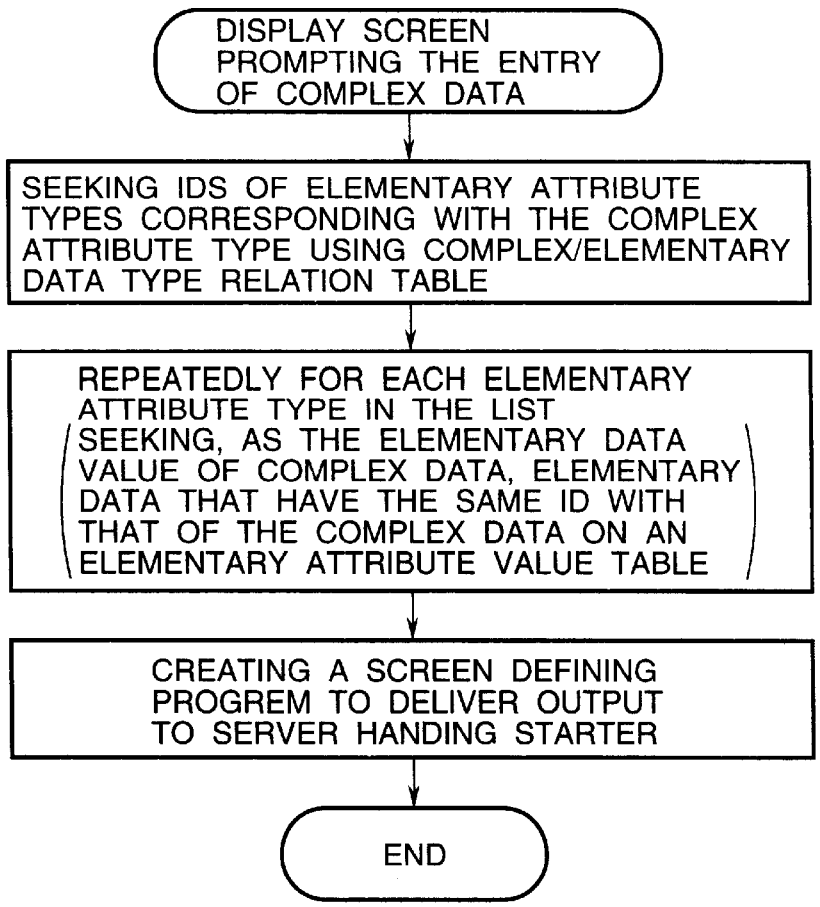

| ELEMENTARY DATA TYPE ID |
|---|
| 1 |
| 2 |
| 7 |

| ELEMENTARY DATA TYPE ID | NAME | DATA CATEGORY |
|---|---|---|
| 1 | TYPE a | INTEGER |
| 2 | TYPE b | CHARACTER STRING [4] |
| 7 | TYPE c | DATE |

FIG.18

```
<!-- Project  : Database Access System           -->
<!-- Update   : 1998-10-16                        -->
<!-- Copyright (c) 1998 KAWASAKI STEEL Systems R&D Corporation -->
<HTML>
<HEAD>
    <META HTTP-EQUIV="Content-Type" CONTENT="text/html; charset=Shift_JIS">
    <META HTTP-EQUIV="Pragma" CONTENT="no-cache">
    <TITLE>[Database Access System]</TITLE>
</HEAD>
<BODY BGCOLOR="#e0e0e0">
<CENTER>
<FORM ACTION="/servlet/register"METHOD="POST" NAME="RegData" ENCTYPE="multipart/form-data">
<!-- HEADER -->
<TABLE WIDTH="100%" BORDER=0>
<TR ALIGN="center">
    <TH><FONT COLOR="#008080" SIZE=+1>REGISTRATION OF COMPLEX DATA</FONT></TH>
    <TD WIDTH="20%" ALIGN="right">HANDLING STATE<FONT COLOR=#b50002">UNREGISTERED</FONT></TD>
</TR>
<TR>
    <TD COLSPAN=2 ALIGN="right">
        <INPUT TYPE="submit" VALUE="REGISTRATION">
        <INPUT TYPE="button" VALUE="TO MENU "onClick="location href='/servlet/menu';"></1
</TR>
</TABLE>
<TABLE WIDTH="100%" BORDER=0>
<TR ALIGN="center">
    <TD>NAME OF COMPLEX DATA</TD>
    <TD>            <INPUT TYPE="text" NAME="name">
    </TD>
</TR>
</TABLE>
```

FIG.19

```
ELEMENTARY DATA :
<TABLE WIDTH="100%" BORDER=1>
<TR ALIGN="center">
    <TD>a TYPE</TD>
    <TD>
        <INPUT TYPE="text" NAME="a" MAXLENGTH=4>(INTEGER)
    </TD>
</TR>
<TR ALIGN="center">
    <TD>b TYPE</TD>
    <TD>
        <INPUT TYPE="text" NAME="b" MAXLENGTH=4>(CHARACTER STRING [4])
    </TD>
</TR>
<TR ALIGN="center">
    <TD>c TYPE</TD>
    <TD>
        <INPUT TYPE="text" NAME="c" MAXLENGTH=2>(DATE)
    </TD>
</TR>
</TABLE>
<BR>
</CENTER>
</FORM>
</BODY>
</HTML>
```

FIG.23

```
<!-- Project     : Database Access System                    -->
<!-- Update      : 1998-10-16                                 -->
<!-- Copyright   (c) 1998 KAWASAKI STEEL Systems R&D Corporation -->
<HTML>
<HEAD>
    <META HTTP-EQUIV="Content-Type" CONTENT="text/html; charset=Shift_JIS">
    <META HTTP-EQUIV="Pragma" CONTENT="no-cache">
    <TITLE>[Database Access System]</TITLE>
</HEAD>
<BODY BGCOLOR="#e0e0e0">
<CENTER>
<FORM ACTION="/servlet/disdata"METHOD="POST" NAME="RegData" ENCTYPE="multipart/form-data">
<!-- HEADER -->
<TABLE WIDTH="100%" BORDER=0>
<TR ALIGN="center">
    <TH><FONT COLOR="#008080" SIZE=+1>SEARCH RESULT OF COMPLEX DATA</FONT></TH>
</TR>
<TR>
    <TD COLSPAN=2 ALIGN="right">
        <INPUT TYPE="button" VALUE="TO MENU" onClick="location href='/servlet/menu';"></1
</TR>
</TABLE>
```

FIG.24

```
<TABLE WIDTH="100% BORDER=l>
<TR ALIGN="center">
    <TD>ID</TD><TD>NAME</TD>
</TR>
<TR ALIGN="center">
    <TD>1</TD>
        <TD>DATA 1</TD>
</TR>
<TR ALIGN="center">
    <TD>2</TD>
        <TD>DATA 2</TD>
</TR>
<TR ALIGN="center">
    <TD>6</TD>
        <TD>DATA 6</TD>
</TR>
</TABLE>
<BR>
</CENTER>
</FORM>
</BODY>
</HTML>
```

FIG.25

SEARCH RESULT OF COMPLEX DATA

| | TO MENU |
|---|---|

| ID | NAME |
|---|---|
| 1 | DATA 1 |
| 2 | DATA 2 |
| 6 | DATA 6 |

FIG.27

```
<!--Project    : Database Access System             -->
<!--Update     : 1998-10-16                         -->
<!--Copyright  (c) 1998 KAWASAKI STEEL Systems R&D Corporation -->
<HTML>
<HEAD>
    <META HTTP-EQUIV="Content-Type" CONTENT="text/html; charset=Shift_JIS">
    <META HTTP-EQUIV="Pragma" CONTENT="no-cache">
    <TITLE>[Database Access System]</TITLE>
</HEAD>
<BODY BGCOLOR="#e0e0e0">
<CENTER>
<FORM ACTION="/servlet/disdata"METHOD="POST" NAME="RegData" ENCTYPE="multipart/form-data">
<!-- HEADER -->
<TABLE WIDTH="100%" BORDER=0>
<TR ALIGN="center">
    <TH COLSPAN=2><FONT COLOR="#008080" SIZE=+1>DISPLAY OF COMPLEX DATA</FONT></TH>
</TR>
<TR>
    <TD COLSPAN=2 ALIGN="right">    <INPUT TYPE="button" VALUE="TO MENU"onClick=location. href='/servlet/menu';></1
</TR>
<TR ALIGN="left">
    <TD>WIDTH=30%>NAME OF COMPLEX DATA</TD>
    <TD>DATA 3</TD>
</TR>
</TABLE>
<TABLE WIDTH="100%" BORDER=1>
<TR ALIGN="left">
    <TD>TYPE c</TD>
    <TD>aaaaaaaa</TD>
</TR>
<TR ALIGN="left">
    <TD>TYPE d</TD>
    <TD>dddddddd</TD>
</TR>
```

FIG.28

```
<TR ALIGN="left">
        <TD>TYPE g</TD>
        <TD>1999-11-20</TD>
</TR>
<TR ALIGN="left">
        <TD>TYPE j</TD>
        <TD>12345678</TD>
</TR>
<TR ALIGN="left">
        <TD>TYPE l</TD>
        <TD>lllllllllllllllll</TD>
</TR>
<TR ALIGN="left">
        <TD>TYPE m</TD>
        <TD>mmmmmmmmmmmmmmmmmm</TD>
</TR>
</TABLE>
<BR>
</CENTER>
</FORM>
</BODY>
</HTML>
```

FIG.29

DISPLAY OF COMPLEX DATA    DATA 3

| NAME OF COMPLEX DATA | |
|---|---|
| TYPE c | aaaaaaa |
| TYPE d | ddddddd |
| TYPE g | 1999-11-20 |
| TYPE j | 12345678 |
| TYPE l | ‖‖‖‖‖‖‖‖‖ |
| TYPE m | mmmmmmmmmmmmm |

TO MENU

FIG.32

| GROUP HIERARCHY DEFINITION TABLE ||
|---|---|
| PARENT GROUP | CHILD GROUP |
| -1 | -2 |
| -1 | -3 |
| -1 | -4 |

FIG.34

| ELEMENTARY DATA TYPE/ OWNER DEFINITION TABLE ||
|---|---|
| ID OF ELEMENTARY DATA TYPE | USER/ GROUP ID |
| 1 | |
| 2 | |
| 3 | -1 |
| 4 | -1 |
| 5 | 1 |
| 6 | 1 |
| 7 | -1 |
| 8 | 1 |
| 9 | -4 |
| 10 | -1 |
| 11 | 1 |
| 12 | -1 |
| 13 | -1 |
| 14 | -4 |
| 15 | -4 |
| 16 | -4 |

FIG.35

| COMPLEX DATA TYPE/ OWNER DEFINITION TABLE RELATING TABLE ||
|---|---|
| ID OF COMPLEX DATA TYPE | USER/GROUP ID |
| 1 | |
| 2 | 1 |
| 3 | -1 |
| 4 | -4 |

FIG.36

E-MAIL ENTRY FORM

YOUR NAME: SAMPLE USER

E-MAIL ADDRESS: sampleuser@ksd.co.jp

TITLE: SAMPLE TITLE

TEXT: TEXT SAMPLE

CANCEL

SEND MAIL

FIG.39

```
Delivery-Agent:  @(#)$Id: local.c,v 1.54 1998/10/30 06:30:53 akira1 Exp $ on
                 xyzxyz
Received:        by ksd.co.jp (AAAAA-1) ; 4 Oct 1999 11:11:48 +0900
Return-Path:     <sampleuser@ksd.co.jp>
Received:        from ksd.co.jp by ksd.co.jp with ESMTP id LAA17826 for
                 <sampleuser@ksd.co.jp>;Mon, 4 Oct 1999 11:08:27 +0900(JST)
Received:        from ksd.co.jp ;Mon, 4 Oct 1999 11:13:43 +0900(JST)
Received:        from ksd.co.jp ;Mon, 4 Oct 1999 11:20:00 +0900(JST)
Message-ID:      <12X80GA4. 9P046629@ksd.co.jp>
Date:            Mon, 04 Oct 1999 11:14:58 +0900
From:            SAMPLE USER<sampleuser@ksd.co.jp>
Organization:    KAWASAKI STEEL SYSTEMS R&D CORPORATION
X-Mailer:        Mozilla 4.5 [ja] (Win95: 1)
```

FIG.40

| | |
|---|---|
| X-Accept-Language: | ja |
| MIME-Version: | 1.0 |
| To: | SAMPLE USER<sampleuser@ksd.co.jp> |
| Subject: | SAMPLE TITLE |
| Content-Tpe: | multipart/mixed; boundary="------------7C68757DA51F5639A9620D71" |
| X-Mozilla-Status: | 8001 |
| X-Mozilla-Status2: | 00000000 |
| X-UIDL: | U2:939470744 |

TEXT SAMPLE

FIG.41

CUSTOMER'S COMMUNICATION FORM

| CUSTOMER'S NAME | SAMPLE USER |
| --- | --- |
| E-MAIL ADDRESS | sampleuser@ksd.co.jp |
| PHONE NUMBER | 03-0000-0000 |
| PRODUCT QUESTIONED | DATABASE ACCESS SYSTEM |
| CATEGORY OF COMMUNICATION | ABOUT USE |
| DETAIL OF COMMUNICATION | METHOD FOR PREPARING AN ELEMENTARY DATA TYPE |

[SEND MAIL] [CANCEL]

FIG.45

```
<%
/*
* Copyright 1999 by Kawasaki Steel Systems R&D Corporation.
* All rights reserved.
*
* This software is the confidential and proprietary information
* of Kawasaki Steel Systems R&D Corporation. You shall not disclose
* such Confidential Information and shall use it only in accordance
* with the terms of the license agreement you entered into with
* Kawasaki Steel Systems R&D Corporation.
*
* THIS SOFTWARE IS AN INTELLECTUAL ASSET OF KAWASAKI STEEL
*   SYSTEMS R&D CORPORATION.
* FOR ITS USE, A WRITTEN PERMISSION FROM KAWASAKI STEEL IS
*   REQUIRED.
*
*/
%>
<%@  content_type="text/html;charset=Shift_JIS"%>
<%@  import="javax.servlet.http.*"%>
<%@  import="javax.servlet.*"%>
<%@  import="jp.co.ksd.dwh.sys.*"%>
<%@  import="java.util.Enumeration."%>
<%@  import="jp.co.ksd.Utility"%>
<HTML>
<%
try{
%>
<BEAN name="exception"type="jp.co.ksd.servlet.http.ErrorPage"></BEAN>
<BEAN name="dspdat"type="jp.co.ksd.dwh.beans.DispData"></BEAN>
<%
        String did,dnm,dsc;
```

FIG.46

```
try{
    exception.setErrorPage("Erro'rjsp");
    exception.setRequest(request);
    exception.setResponse(response);
    exception.setServlet(this);

String id = request.getParamenter("DataId");
    dspdat.setId(id);
    dspdat.setRequest(request)
    dspdat.getFromDB(true);
    Data data = dspdat.getResult();
    did = data.getId().getStringValue();
    dnm = data.getName();
    dsc = data.getDescription();

%>

<HEAD>
  <META HTTP-EQUIV="Content-Type" CONTENT="text/html; charset=Shift_JIS">
</HEAD>

<BODY BACKGROUND="/img/back.gif">
  <H3 ALIGN="center">CHANGING DATA</H3>
  <FORM ACTION="/UpdtData.jsp"NAME="UpdtData"TARGET="DATA" onSubmit="return go();">
    <INPUT TYPE="hidden"NAME="id"VALUE="<%=did%>">
    <TABLE BORDER=0 CELLPADDING=0 CELLSPACING=0 WIDTH="100%">
      <TR><TD ALIGN="right">NAME:</TD>
        <TD><INPUT TYPE="text"    NAME="name" VALUE="<%=dnm%>"SIZE=20 MAXLENGTH=32></TD></TR>
      <TR><TD ALIGN="right">
        <TD><TEXTAREA NAME="REMAKES"ROWS=3 COLS=18 WRAP="virtual"><%=dsc%></TEXTAREA></TD></TR>
    </TABLE>
```

FIG.47

```
    <CENTER>
       <INPUT  TYPE="submit"  VALUE="REGISTRATION">
       <INPUT  TYPE="reset"   VALUE="RESET">
       <INPUT  TYPE="button"  VALUE="CANCEL">
  onClick="location.href='/DispData.jsp?id=<%=did%>';">
    </CENTER>
    </FORM>
    </BODY>
  <%
       } catch(Exception e) {
              exception.display(e);
       }
  } catch (Exception e2) {
  <%
  <BODY>
  <H3>NO SESSION AVAILABLE. LOG-IN AGAIN.</H3>
  <A HREE="/Login.jsp">LOG-IN</a>
  <BODY>
  <%
  }
  %>
  </HTML>
```

FIG.50

MENU OF DATA TYPES

| NAME OF ELEMENTARY DATA TYPE |
|---|
| TYPE a |
| TYPE b |
| TYPE i |
| TYPE n |
| TYPE o |
| TYPE p |

TO MENU

FIG.51

```
<!-- Project    : Database Access System                    -->
<!-- Update     : 1998-10-16                                 -->
<!-- Copyright  (c) 1998 KAWASAKI STEEL Systems R&D Corporation  -->
<HTML>
<HEAD>
    <META HTTP-EQUIV="Content-Type" CONTENT="text/html; charset=Shift_JIS">
    <META HTTP-EQUIV="Pragma" CONTENT="no-cache">
    <TITLE>[Database Access System]</TITLE>
<SCRIPT LANG="JavaScript">
<!--
function putelement(id){
    parent.opener.document.forms[0].element.value=id;
}
//END -->
</SCRIPT>
</HEAD>
<BODY BGCOLOR="#e0e0e0">
<CENTER>
<FORM ACTION="/servlet/disdata"METHOD="POST" NAME="RegData" ENCTYPE="multipart/form-data">
<!-- HEADER -->
TABLE WIDTH="100%"BORDER=0
<TR ALIGN="center">
    <TH><FONT COLOR="#008080" SIZE=+1>MENU OF DATA TYPES</FONT></TH>
</TR>
<TR><TD COLSPAN=2 ALIGN="right">
    <INPUT TYPE="button" VALUE="TO MENU"onClick="location.href='/servlet/menu' ;"></TD>
</TR>
```

FIG.52

```
</TABLE>
<TABLE WIDTH="100%" BORDER=1>
<TR ALIGN="center">
    <TD>NAME OF ELEMENTARY DATA TYPE</TD>
</TR>
<TR ALIGN="center">
    <TD><A HREF="javascript:putelement(1)">TYPE a</A></TD>
</TR>
<TR ALIGN="center">
    <TD><A HREF="javascript:putelement(2)">TYPE b</A></TD>
</TR>
<TR ALIGN="center">
    <TD><A HREF="javascript:putelement(9)">TYPE i</A></TD>
</TR>
<TR ALIGN="center">
    <TD><A HREF="javascript:putelement(14)">TYPE n</A></TD>
</TR>
<TR ALIGN="center">
    <TD><A HREF="javascript:putelement(15)">TYPE o</A></TD>
</TR>
<TR ALIGN="center">
    <TD><A HREF="javascript:putelement(16)">TYPE p</A></TD>
</TR>
</TABLE>
<BR>
</CENTER>
</FORM>
</BODY>
</HTML>
```

FIG.54

DISPLAY PROMPTING SELECTION OF COMPLEX DATA TYPE

| NAME OF COMPLEX DATA TYPE |
|---|
| TYPE A |
| TYPE B |
| TYPE C |

TO MENU

FIG.55

```
<!-- Project     : Database Access System              -->
<!-- Update      : 1998-10-16                          -->
<!-- Copyright   (c) 1998 KAWASAKI STEEL Systems R&D Corporation  -->
<HTML>
<HEAD>
    <META HTTP-EQUIV="Content-Type" CONTENT="text/html; charset=Shift_JIS">
    <META HTTP-EQUIV="Pragma" CONTENT="no-cache">
    <TITLE>[Database Access System]</TITLE>
<SCRIPT LANG="JavaScript">
<!--
function StartRristration(id){
    location.href="/servlet/register?dataType="+id;
}
//END -->
</SCRIPT>
</HEAD>
<BODY BGCOLOR="#e0e0e0">
<CENTER>
<FORM ACTION="/servlet/disdata"METHOD="POST" NAME="RegData" ENCTYPE="multipart/form-data">
<!-- HEADER -->
TABLE WIDTH="100%" BORDER=0>
<TR ALIGN="center">
    <TH><FONT COLOR/="#008080" SIZE=+1>DISPLAY PROMPTING SELECTION OF COMPLEX DATA
    TYPE</FONT></TH>
</TR>
```

FIG.56

```
<TR>
    <TD COLSPAN=2 ALIGN="right">
        <INPUT TYPE="button" VALUE="TO MENU" onCLICK="location.href='/servlet/:'"></TD>
</TR>
</TABLE>
<TABLE WIDTH="100%" BORDER=1>
<TR ALIGN="center">
    <TD>NAME OF COMPLEX DATA TYPE</TD>
</TR>
<TR ALIGN="center">
    <TD><A HREF="javascript:StartRegistration(1)">TYPE A</A></TD>
</TR>
<TR ALIGN="center">
    <TD>A HREF="javascript:StartRegistration(2)">TYPE B/A></TD>
</TR>
<TR ALIGN="center">
    <TD>A HREF="javascript:StartRegistration(3)">TYPE C</A></TD>
</TR>
</TABLE>
<BR>
</CENTER>
</FORM>
</BODY>
</HTML>
```

DATABASE ACCESS SYSTEM TO DELIVER AND STORE INFORMATION

CROSS-REFERENCES TO RELATED APPLICATIONS

Not Applicable

BACKGROUND OF THE INVENTION

1. Field of the Invention

The present invention relates to a database access system which delivers and stores information in response to accesses from a plurality of users. More particularly, this invention relates to a database access method whereby it is possible to build a database which may have various data structures, without requiring new programs to be prepared for those structures, thereby reducing the time, labor and cost required for the preparation of such programs, and relieving the database builder of technical knowledge usually required for such database construction, a database access system based on that method, and a recording medium to record computer programs related with such a database access system, capable of being read by a computer.

2. Description of the Related Art including information disclosed under 37 CFR 1.97 and 1.98

To build a system enabling the use of a database, it is common to determine the table constitution at first, and then prepare a computer program, so that data can be entered and extracted into and from a database according to the name of tables, column headings, etc.

However, with such a system, if any element of the table constitution or any column heading is modified, it will be necessary, even if the new system is similar in function, to modify the program in association with the modification. Moreover, if it becomes necessary to modify any element of the table constitution or column heading after the system has been run, it will be necessary to reenter data as well as to modify the program. Such a system has another problem that, even though the system remains the same, if the language used for describing the name of table or column heading which has been compatible with the language of the database server is substituted for another, it will be also necessary to modify the program.

To meet such problems, a method has been proposed like the present invention wherein complex data comprising a number of elements are fed and extracted to and from a database, and structure defining data are introduced independently of a physical table carrying a database, thereby ensuring the structural alterability and diversity of the complex data. Such a method is disclosed in Japanese Patent Laid-Open Nos. 11-249952 and 11-265395. The invention of Japanese Patent Laid-Open No. 11-249952 provides complex data as an object whose attribute is alterable, while the invention of Japanese Patent Laid-Open No. 11-265395 provides the complex data as a virtual table whose relation to the real table is alterable.

However, with these two inventions, the types of elementary data are not defined independently of the types of complex data, contrary to the present invention. Further, both the inventions do not give a solution to the problem involved in the substitution of the database server language for another.

With the invention of Japanese Patent Laid-Open No. 11-249952, an attribute is independent of the object which constitutes. With the invention of Japanese Patent Laid-Open No. 11-265395, the column heading of a virtual table is directly related with the column heading of a real table. Accordingly, with the former invention, different kinds of objects can not share a common attribute. With the latter invention, because the real column data are directly related with the virtual column data, it will be impossible to express that different columns in different virtual tables contain same contents. It will be also impossible to search through different data masses over different types of complex data using an elementary data value put under a common data category. For example, with the latter method, a case is incompatible with the system where complex data types A, B and C have the date of data registration as an data category, and manages data masses using that date of registration data element, while the rest complex data types don't, nor a case where different data masses are searched over plural complex data types using a period during which data registration has been made.

Take, as an example, management files of companies. Various personnel files may include the name of employees, ID No., etc. in common, while various design files may include the project code, storage period, etc. in common. There often occur a plurality of common data items among different files, and if such commonness is not introduced in the system to allow the user to search across different data masses using a common data value, it will be very inconvenient.

Further, with the inventions of Japanese Patent Laid-Open Nos. 11-249952 and 11-265395, although the structure defining data are introduced to ensure the alterability and diversity of database structure, the structure management data are not managed in relation to users. Because of this, the access authorization to the structure definition cannot be controlled based on the grouping of users. This functional shortage causes various inadequate data management, e.g., a management file of a company whose access should be limited to specified departments or authorized groups will be accessible to any employees, or an employee will have to run through numerous, useless data before he will be able to reach a particular kind of data.

BRIEF SUMMARY OF THE INVENTION

The present invention has been proposed to give a solution to the above problems, and aims at providing a database access system whereby it is possible to construct a database, even when the database is to contain complex data with various configuration, without requiring separate or new programs for those variety of data configurations, by only altering the content of definition tables, thereby reducing the time, labor and cost required for the preparation of such programs, and relieving the database builder of technical knowledge usually required for such database construction.

The first invention specified here provides a database access method to deliver and store information from and in a database in response to instructions through accesses from a plurality of users, wherein single data blocks constituting the database or their clusters are made elements; data masses each comprising at least one element are prepared; data structures are defined for the data masses; elementary data type definitions are introduced to define the type of various data collected in the database at least by the data category and ID; complex data type definitions are introduced to define the complex of elementary data type definitions; the various data masses available to users are defined by specifying complex data types and assigning ID codes to the data masses; feeding individual data into the database occurs by preserving an area in the storage space of the database for each elementary data type, and storing data in a corresponding area together with the ID code defining the data mass it constitutes; and access to individual data in the database occurs by specifying the ID code for data mass, and the related complex data type definition. This forms a solution to the above problem. When locating data in a database by this method, direct notification of the names of corresponding table and column heading is not required. Accordingly, the language used for description of tables and column headings may be put aside from consideration, which relieves the database builder of a burden of changing table names or column heading names in the program which is required whenever the database server is substituted to support an incompatible language. This forms another solution to the above problem.

Further, with the database access method representing the first invention, the database information comprises electronically stored documents; the complex data type definitions are a stored assembly of format documents to serve as a model for document preparation, accompanied with typical attributes to be given to a prepared document, and document-related information files; to prepare a document, any one is selected from the format documents; a desired document is prepared according to that format; and the prepared document is stored together with attribute values necessarily given to the document before storage, and supplementary attribute values added as needed. This forms a still further solution to the above problem. Moreover, the first invention specified here can be used as a document attribute management system.

Still further, with the database access method representing the first invention, information stored is organized in a hierarchical structure like a tree in which a plurality of groups are arranged such that any group has one or less group on the layer just above it; a user, who defines a complex data type by specifying elementary data types as its members, or registers a data mass by specifying its complex data type, the data is assigned without fail to a group; and selection of users accessible to a particular elementary or complex data type who notifies an elementary or complex data type, is achieved by using at least the information of the hierarchical structure. This forms a still further solution to the above problem.

Still further, with the database access system representing the first invention, information of an owner group is stored for each elementary and complex data type; information of authorized groups and authorized operations is stored for each elementary and complex data type; and selection of users who are permitted to handle or use a particular elementary or complex data type, to view or change its definitions, or to handle or use a particular elementary data type to make the definition of a complex data type, or to handle or use a complex data type to make the definition of a data mass, is achieved by using the information of owner group and authorized groups as well as the information of the hierarchical data structure. This forms a still further solution to the above problem.

The second invention specified here provides a database access system to deliver and store information from and in a database in response to instructions through accesses of a plurality of users, comprising following data storages, in accordance with the structure of the data masses which are made of at least single data block; the elementary data type definition table storage for storing elementary data type definitions which define the type of various data collected in the database at least by the data category and ID, wherein single data blocks constituting the database or their clusters are made elements, data masses each comprising at least one element are prepared, data structures are defined for the data masses; a complex data type definition table storage for storing at least ID codes of complex data type which define the type of data masses; a complex/elementary data type relation table storage for storing at least one elementary data type in relation to each complex data types; and a data mass storage for storing definition of each data mass accessible to users at least by the notified ID codes of complex data type and ID codes attached to the data masses; whereby feeding individual data into the database occurs by preserving an area in the storage space of the database for each elementary data type, and storing data in a corresponding area together with the ID code defining the data mass the data constitute; and access to individual data in the database occurs by referring to the complex/elementary data type relation table using the ID code of a complex data type which is stored in the data mass storage coupled with the corresponding data mass, thereby obtaining the area where a desired elementary data type is stored, and then by identifying a desired data mass using the ID code of data mass for access. This forms a still further solution to the above problem.

Further, with the database access system representing the second invention, a hierarchical structure defining portion is for storing information organized like a tree in which a plurality of groups are arranged such that any group has one or less group on the layer just above it; a user belonging determining portion for assigning each user, who specifies elementary data types for defining complex data types, or specifies complex data types for defining data masses to a group without fail: and a user selecting portion for selecting users who are permitted to access to a particular elementary or complex data type according to the information of the group hierarchy structure. This forms a still further solution to the above problem.

Still further, with the database access system representing the second invention, an owner group information storage for storing information of an owner group for each elementary or complex data type; an authorization information storage for storing information of authorized groups and authorized operations for each elementary or complex data type; and an user selecting portion for selecting users who are permitted to view or change the definitions of a particular elementary or complex data type, or to use a particular data category to make the definition of a complex data type, or to use a complex data type to make the definition of a data mass, on the basis of the information of owner groups and authorization information as well as the information of the hierarchical data structure. This forms a still further solution to the above problem.

Still further, with the database access system representing the second invention, the data category definition table storage, complex data type definition table storage, and complex/data category relation table storage are integrated in a database server unit; a display function program is introduced which automatically creates a screen defining program on the basis of information stored in the storages for data category definition table, complex data type definition table, and complex/elementary data type relation table; an assembly of such display function programs are stored in a web server unit together with screen defining programs created by them; and access to individual data in a database occurs by using the screen defining programs. This forms a still further solution to the above problem.

With this invention, the web server unit is not limited to an ordinary one. It may be, for example, a user interface unit having a similar function. Or it may be an internet server.

Still further, the database access system of the second invention may have two or more web server units. This forms a still further solution to the above problem.

Still further, with a database access system according to this invention to deliver and store information from and in a database in response to instructions through access from a plurality of users, the database is stored in a database server unit; a web server unit connected to the database server unit is provided; a client unit is connected to the web server unit through a communication line; and the user can access to the database using a web browser installed in the client unit through the communication line and web server unit. This forms a still further solution to the above problem.

With this invention, the web server unit is not limited to an ordinary one. It may be, for example, a software package having a similar function, or a client software package having a similar function, or an internet client.

Still further, with a database access system according to this invention to deliver and store information from and in a database in response to instructions through access from a plurality of users, the database is stored in a database server unit; a web server unit is connected to the database server unit through a local area network (LAN); a client unit is connected to the web server unit through the LAN; and the user can access to the database using a web browser installed in the client unit through the LAN and web server unit. This forms a still further solution to the above problem.

Still further, with a database access system according to this invention to deliver and store information from and in a database in response to instructions through access from a plurality of users, the database is stored in a database server unit; at least one web server unit is connected to the database server unit through a exclusive communication line; a client unit is connected to the web server unit through communication lines containing at least the internet; and the user can access to the database using a web browser installed in the client unit through the communication line and web server unit. This forms a still further solution to the above problem.

Still further, a recording medium capable of being read by a computer is provided which records a computer program to control the elementary data type definition table storage, complex data type definition table storage, and elementary/complex data type relation table storage of the second invention. This forms a still further solution to the above problem.

Another recording medium capable of being read by a computer is provided which records a computer program to activate the hierarchical structure defining portion, user's belonging determining portion, and user selecting portion. This forms a still further solution to the above problem.

A still further recording medium capable of being read by a computer is provided which records a computer program to activate the portions for storing information of owner groups, authorization information to particular data, and selection of users for access to particular data. This forms a still further solution to the above problem.

Still further, with a document attribute managing method according to this invention whereby it is possible to electronically store documents and information of the attributes of those documents necessary for the management of documents, format documents to serve as a model for document preparation are stored as an assembly of files containing typical attributes to be given to a prepared document, and document-related information; to prepare a document, an appropriate one is selected from the format documents; a desired document is prepared according to that format; and the prepared document is stored together with the attribute values in the assembly necessarily given to the document before storage, and supplementary attribute values added as needed. This forms a still further solution to the above problem.

Still further, with a document attribute managing system according to this invention whereby it is possible to electronically store documents and information of the attributes of those documents necessary for the management of documents, a format document storing device is implemented to store format documents useful for document preparation as an assembly of files together with typical attributes necessarily given to a prepared document, and document-related information; an input device is implemented which, when, for preparing a document, an appropriate one is selected from the format documents, a desired document is prepared according to that format, and the prepared document is stored, determines the appropriate name of document, and attributes and attribute values to be supplemented; and a document storing device is implemented which stores the thus prepared document together with attributes necessarily given to the document before storage, and their values, and supplementary attributes and their values added as needed. This forms a still further solution to the above problem.

Still further, a recording medium capable of being read by a computer is provided which records a computer program to control the format document storing device, input device and document storing device. This forms a still further solution to the above problem.

Still further, with a database access method of this invention to allow search through data stored in a database in response to requests through access from a plurality of users, single data blocks constituting the database or their clusters are made elements; data masses each comprising at least one element are prepared; data structures are defined for the data masses; elementary data type definitions are introduced to define the type of various data collected in the database at least by the type and ID; the complex data type definitions is introduced as a mass of elementary data type definitions; each of the various data masses available to users is defined by specifying a complex data type and adding an ID code to the data mass; feeding individual data into the database occurs by preserving an area in the storage space of the database for each elementary data type, and storing data in a corresponding area together with the ID code defining the data mass the data constitutes; and locating desired data in the database occurs by describing a search condition through a logic computation based on at least a combination of one elementary data type and its value, and seeking a data mass meeting the search condition, regardless of the type of involved complex data mass. This forms a still further solution to the above problem.

Still further, with a database access system of this invention to allow search through data stored in a database in response to requests through access from a plurality of users; a first means is implemented to prepare elementary data type definitions to define the type of various data collected in the database at least by the type and ID according to the data structure of data mass wherein single data blocks constituting the database or their clusters are made elements, data masses each comprising at least one element; a second means is implemented to define each of the various data masses available to users by specifying a complex data type and adding an ID code to the data mass, wherein complex data type definitions are introduced as mass of the type of elementary data type definitions; a third means is implemented to store the data, when feeding individual data into the database occurs by preserving an area in the storage space of the database for each data category, and storing data in a corresponding area together with the ID code of the data mass the data constitutes; and locating desired data in the database occurs by describing a search condition through a logic computation based on a combination of at least one set of an elementary data type and its value, and by seeking a data mass meeting the search condition, regardless of the type of involved complex data. This forms a still further solution to the above problem.

Still further, a recording medium capable of being read by a computer is provided which records a computer program to control the first to third means of the database access system. This forms a still further solution to the above problem.

Still further, with a database access system of this invention to allow search through data stored in a database in response to requests through access from a plurality of users, an elementary data type definition table storage is implemented for to storing elementary data type definitions which define the types of various data collected in the database at least by the type and ID in accordance with the data structures constituting the data mass, wherein single data blocks constituting the database or their clusters are made elements, data masses each comprising at least one element are prepared; a complex data type definition table storage is implemented for storing at least ID codes of complex data types which define the type of data masses, a complex/elementary data type relation table storage is implemented for storing at least one elementary data type in relation to each complex data type to define the complex data type as a mass of elementary data type; and a data mass storage is implemented for storing definitions of data masses at least by the notified ID codes of complex data type and ID codes of the data mass on the ground that those data masses may be accessible to users through notification of complex data types and IDs of data mass; searching a desired data mass in the database occurs by obtaining a search condition through a logic computation based on a combination of at least one set of an elementary data type and its value, and by searching through the data mass storage, complex data type definition table storage, complex/elementary data type relation table storage, and elementary data type definition table storage, using the search condition, and thus finding a data mass meeting the search condition, regardless of the type of involved complex data. This forms a still further solution to the above problem.

Still further, a recording medium capable of being read by a computer is provided which records a computer program to control the elementary data type definition table storage, complex data type definition table storage, and complex/elementary data type relation table storage of the database access system. This forms a still further solution to the above problem.

Operation of the present invention will be briefly outlined below.

FIG. 1 is a block diagram to show the composition of a typical database access system of this invention.

The database access system shown in FIG. 1 is one to deliver and store information from and in a database in response to instructions through access from a plurality of users. The database access system of this invention comprises an elementary data type definition table storage 11, complex data type definition table storage 12 and complex/elementary data type relation table storage 13. These stor-ages constitutes a database definition information group 10 as shown in the figure. When the user accesses to a real database 16 comprising individual data arranged in accordance with the definitions provided by the database definition information group 10, he uses a complex data recording table 15.

With this invention, to build a database, a single data block or a cluster of data blocks is taken as an element; a data mass contains at least one element; and special attention is paid to the structure of the data mass. For this purpose, the type of data is defined; and a data mass comprising the data is prepared in accordance with the data type defined. With this invention, storage of data in a database and access to data in a database occurs through the defined data type, or more concretely, by the definitions given in tables.

The elementary data type definition table storage 11 stores elementary data type definitions to define the type of various data stored in a database at least by the data type and ID. The complex data type definition table storage 12 stores the definitions of various data masses available to users after the definitions have been given through the elementary data definition table storage 11. The data mass may be taken as a list of complex data types usable as a structure of the data available to users.

The complex/elementary data type relation table storage 13 stores definitions to show which complex data type comprises which elementary data types.

Feeding individual data into a database according to the definitions given by the database definition information group 10 is accompanied by recording at least an ID code uniquely specifying the complex data block, and the complex data type into the complex data recording table. Further, for each of the elementary data types constituting the complex data type, the elementary data is stored into a memory space previously prepared in the database for each elementary data type, to be thus stored in the real database 16 together with the ID code. To access to a desired elementary data stored in the real database 16, the user finds a desired complex data in the complex data recording table, to obtain its ID and complex data type; he refers then to the complex/elementary data type recording table to know at what area in the real database 16 the desired data element exists in the memory space prepared for each elementary data type; and he obtains the desired data element by seeking the data having the ID obtained from the complex data recording table.

As seen from above, with this invention, it is possible to construct various types of database by simply altering the definitions listed in the tables, without requiring the remake of programs for the change, and thus to reduce the time, labor and cost required for the preparation of such programs, and relieve the database builder of technical knowledge usually required for such database construction.

FIG. 2 is a block diagram to show the composition of a typical database access system that allows the selection of users according to this invention.

The database access system shown in FIG. 2 is for delivering and storing information from and in a database in response to instructions through access of a plurality of users, and also for storing information necessary for management of data accesses. The database access system comprises a group definition table storage 21, structure definition table storage 22 and user definition table storage 23.

The group definition table storage 21 stores information of individual groups, by group IDs assigned to each group.

The structure definition table storage 22 stores definitions to determine the relations of group IDs or user IDs in terms of their departments or users. The user definition table storage 23 stores information of individual users in terms of their user IDs.

With this invention, individual groups, and users belonging to those groups are defined in a tree-like structure. The definition is also given by the setting in the tables, which have been appropriately modified for this purpose. With this invention, information of groups and users is organized in a hierarchical structure comprising at least one tree-like structure in which groups and users are arranged such that any group or user has one or less group or user on the layer just above it; and the information is stored in the tables. The definition is prepared such that every user who may possibly access to the database is assigned without fail to a group. Selection of groups or users who are permitted to access to or give modifications to a particular data element is achieved on the basis of the information of the group hierarchy structure stored in the tables.

This invention is so prepared, although it is not limited to this alone, as to make it possible to select appropriate users for a particular data element and construct various types of database, by simply altering the definitions listed in the tables, without requiring the remake of programs for the change, and thus to reduce the time, labor and cost required for the preparation of such programs, and relieve the database builder of technical knowledge usually required for such database construction.

The first invention specified here can be applied for the production of a document attribute management system. For example, it can be applied as shown in FIG. 3. This example will be described later as a second embodiment. FIG. 3 is a block diagram to show the composition of such a document attribute management system.

The document attribute management system shown in FIG. 3 stores electronically not only documents but information of their attributes necessary for their management. The document handled by the document attribute management system may include, for example, a document carrying various items and data such as an "invoice," document prepared as a document file on a word-processor, graphics, and various others. A graphics prepared as a CAD data file on a CAD software package may be handled as a document.

This document attribute management system comprises a format document storing device 33, input device 35, and document storing device 34. It may further comprise a display device 36 as needed.

The format document storing device 33 stores various format document to serve as a model for document preparation as an assembly of files together with necessary attributes and document-related information. The necessary attributes may include, for example, the name and author of the document. Such attributes must be implemented whenever a document is stored, in order to ensure its secure management.

The necessary attribute may include, for example, information such as the name of author of a document which is used for the management of the document, or information through which the document is used in a database for document search and so on. The name of a document which must be attached to a document whenever the document is stored may be taken as one of such attributes.

The above attribute may include data incorporated in a document containing various items and data, such as "names of customers," or "names of purchased goods" in an "invoice." Or, the document-related information file may include a document data file prepared on a word-processor, and a CAD data file of graphics prepared on a CAD software package when graphics are managed as the document. The document-related information file is handled as the attribute.

The input device 35 is used for selecting an appropriate format document before a new document is prepared. When a document has been prepared according to the format document, and it is stored, the input device is used for setting values of necessary attribute items and supplementary attribute items and their values added as needed. The document storing device 34 stores the prepared document together with its set value of necessary attribute item and supplementary attribute items and their values.

With this document attribute management system, when a document is electronically stored, information of the attributes of the document which are necessary for the management of the document is stored in association. Information of the attributes is used for searching or managing the document.

With this document attribute management system, various format document to serve as a model for document preparation are stored as an assembly of files together with necessary attributes and document-related information. When a new document is prepared, an appropriate model document is selected from the format documents, and a desired document is prepared according to the model document.

Then, it is known what attributes are necessary for a new document. If appropriate attributes are attached to the new document, then necessary attributes are attached according to the model document. Therefore it is possible with such an arrangement to reduce the labor and time involved in the work while ensuring the opportunity of properly and speedily providing the user with various attributes necessary for proper management of the document. The thus prepared document is stored together with the necessary attribute values and supplementary attribute items and their values added as needed.

With such a document attribute management system, it is possible to provide various attributes necessary for management of documents properly and speedily, and to reduce the labor and time required for the work, and to improve the resolution of data search with use of the attributes. It is also possible to construct various types of database by simply altering the definitions listed in the tables, without requiring the remake of programs for the change, and thus to reduce the time, labor and cost required for the preparation of such programs, and relieve the database builder of technical knowledge usually required for such database construction.

Selection of users as described in relation to the invention with reference to FIG. 2 is applicable to the document access management system. For example, FIG. 4 gives such an application which will be later described as a second embodiment. FIG. 4 is a block diagram to show the composition of such a document access management system.

The document access management system shown in FIG. 4 stores electronically not only documents but information necessary for management of the access to them. The document access management system comprises a group hierarchy structure information storing device 43, document storing device 41 and selection management device 45. Symbol 47 represents a document accessible to users.

With the document access management system, users accessible to a document are selected on the basis at least of their qualification for the reference to the document. The document access management system may select users on the basis of their qualification for the updating of the document, although it is not limited to it alone. The document access management system may further select users on the basis of their qualification for a management authority to give a permission to view the document to a third party.

With this system, every user that may at least make reference to a document is assigned without fail to a group. For example, a user's group management information storing device 44 is implemented as needed to store the information regarding the setting of groups to which a given user belongs, as the users group management information.

Information of the owner group including, as at least one of the access management information, owner group information which shows an original group for management to update documents or determine the addressees of the documents, and access authorized group information to show access authorized group may be stored in the document storing device 41 together with the related documents. Alternatively, as shown in the figure, it is also possible to implement, apart from the document storing device 41, an access management information storing device 42 to store the information regarding the original groups, and information regarding groups permitted to access to the above information.

In FIG. 4, the group hierarchy structure information storing device 43 stores information of groups which are organized in a hierarchical structure comprising at least one tree-like structure in which groups are arranged such that any group has one or less group on the layer just above it. The document storing device 41 may further store, as one of the access management information, for each document, regarding the owner group which is responsible for the updating and distribution of the document, and information of the groups which are permitted to access to the document, in addition to the document itself. The selection management device 45 selects users that are permitted to access to a document, or management of a document, at least on the basis of information of the groups organized in a group hierarchy structure, or information of the original groups.

Firstly, the document access management system having the above constitution stores information of groups which are organized in a hierarchical structure comprising at least one tree-like structure in which the groups are arranged such that any group has one or less group on the layer just above it. Then, a user that may at least access to a document is assigned without fail to a group. The system may further store, as at least one of the access management information, for each document, regarding the owner group which is responsible for the updating and distribution of the document, an information of the groups which are permitted to access to the document, in addition to the document itself.

The system selects users 48 that may access to a document or manage a document at least on the basis of information of the group hierarchy structure, and of the original groups. Therefore, with this system, it is possible to select users 48 that may access to a document or manage a document flexibly in accordance with the business condition requiring the document. With this system it is also possible to efficiently specify or implement a new selection mode in accordance with the business condition. Moreover, with this system, it is still further possible to construct a database by simply arranging the definitions listed in the tables, to thereby reduce the time, labor and cost required for the preparation of a database, and relieve the database builder of technical knowledge usually required for such database construction.

These and other novel features and advantages of the present invention will become apparent from the following detailed description of preferred embodiments.

BRIEF DESCRIPTION OF THE SEVERAL VIEWS OF THE DRAWINGS

The preferred embodiments will be described with reference to the drawings, wherein like elements have been denoted throughout the figures with like reference numerals, and wherein:

FIG. 15 is a flow chart representing the data handling steps of the embodiment taken for the registration of complex data types;

FIG. 16 is a flow chart representing the data handling steps of the embodiment taken for the determination of the elementary data types constituting the complex data types;

FIG. 17 is a data composition diagram to show the work data areas used in the embodiment;

FIG. 18 is a first program list of the embodiment to show an example of a program to define a display prompting the entry of complex data type;

FIG. 19 is a second program list of the embodiment subsequent to the first program list;

FIG. 23 is a first program list of the embodiment to show an example of a program to define a display giving the result of search through complex data;

FIG. 24 is a second program list of the embodiment subsequent to the first program list;

FIG. 25 is a diagram to show an example of a screen display on a web browser invoked by the program for defining the screen display of the search result through the complex data;

FIG. 27 is a first program list of the embodiment to show an example of a program to define a display giving complex data;

FIG. 28 is a second program list of the embodiment subsequent to the first program list;

FIG. 29 is a diagram to show an example of a screen display on a web browser invoked by the program for defining the display of the complex data;

FIG. 32 is a second data composition chart of the embodiment to show the composition of database including information of users, together with the above data composition chart;

FIG. 34 is a data composition chart of the embodiment to give an elementary data type owner definition table to record the relation between the elementary data type and the user;

FIG. 35 is a data composition chart of the embodiment to give a complex data type owners definition table to record the relation between the complex data type and the user;

FIG. 36 is a screen display of a first example incorporating the embodiment to give a data entry form and data entered on a homepage;

FIG. 39 is a first program list of the embodiment modified to be adaptive for an electronic (E)-mail;

FIG. 40 is a second program list subsequent to the above program list;

FIG. 41 is a screen display of a second example incorporating the embodiment to give a data entry screen and data entered;

FIG. 45 is a first program list to show a part of a program to define a screen display to be created by the document management server unit of the embodiment and to be sent to a client unit;

FIG. 46 is a second program list subsequent to the first list;

FIG. 47 is a third program list subsequent to the second list;

FIG. 50 is a diagram to show, in a third example incorporating the first embodiment, an example of screen display giving a list of elementary data types accessible to users, to prompt a user to choose an elementary data type constituting a complex data type;

FIG. 51 is a first program list to show a program to define the above screen display;

FIG. 52 is a second program list subsequent to the above list;

FIG. 54 is a diagram to show, in the third example, an example of screen display giving a list of complex data types accessible to users, to prompt a user to choose a complex data type;

FIG. 55 is a first program list to show a program to define the above screen display;

FIG. 56 is a second program list subsequent to the above list; and

DETAILED DESCRIPTION OF THE INVENTION

The embodiments of the present invention will hereunder be described in detail with reference to the accompanying drawings.

Firstly, the first embodiment representing an application of this invention will be described, followed by the first and second examples representing applications of the first embodiment. Then, the second embodiment representing another application of this invention will be described.

Figure 5:
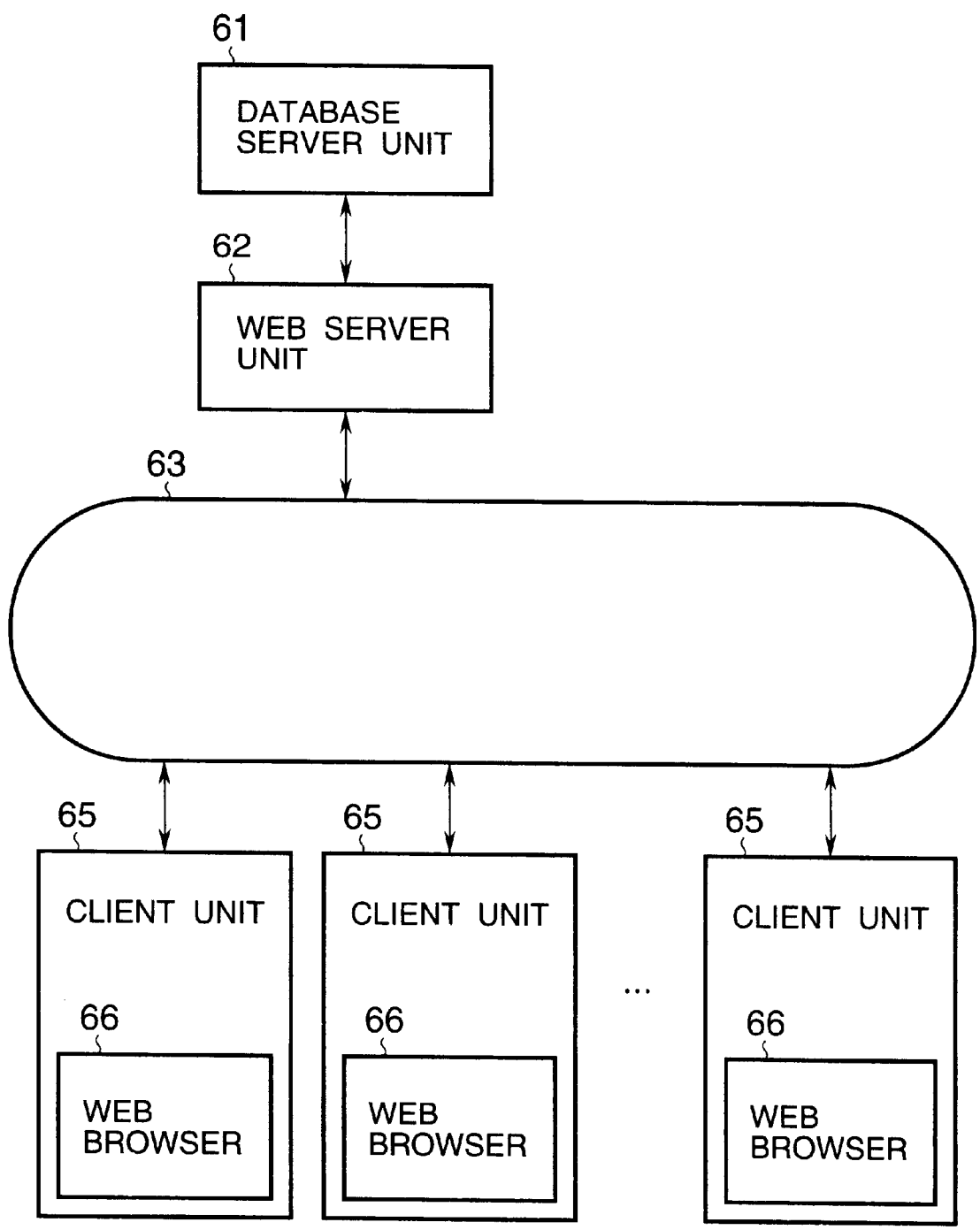
FIG. 5 is a block diagram to show the composition of a database access system representing a first embodiment incorporating the present invention.
Figure 6:
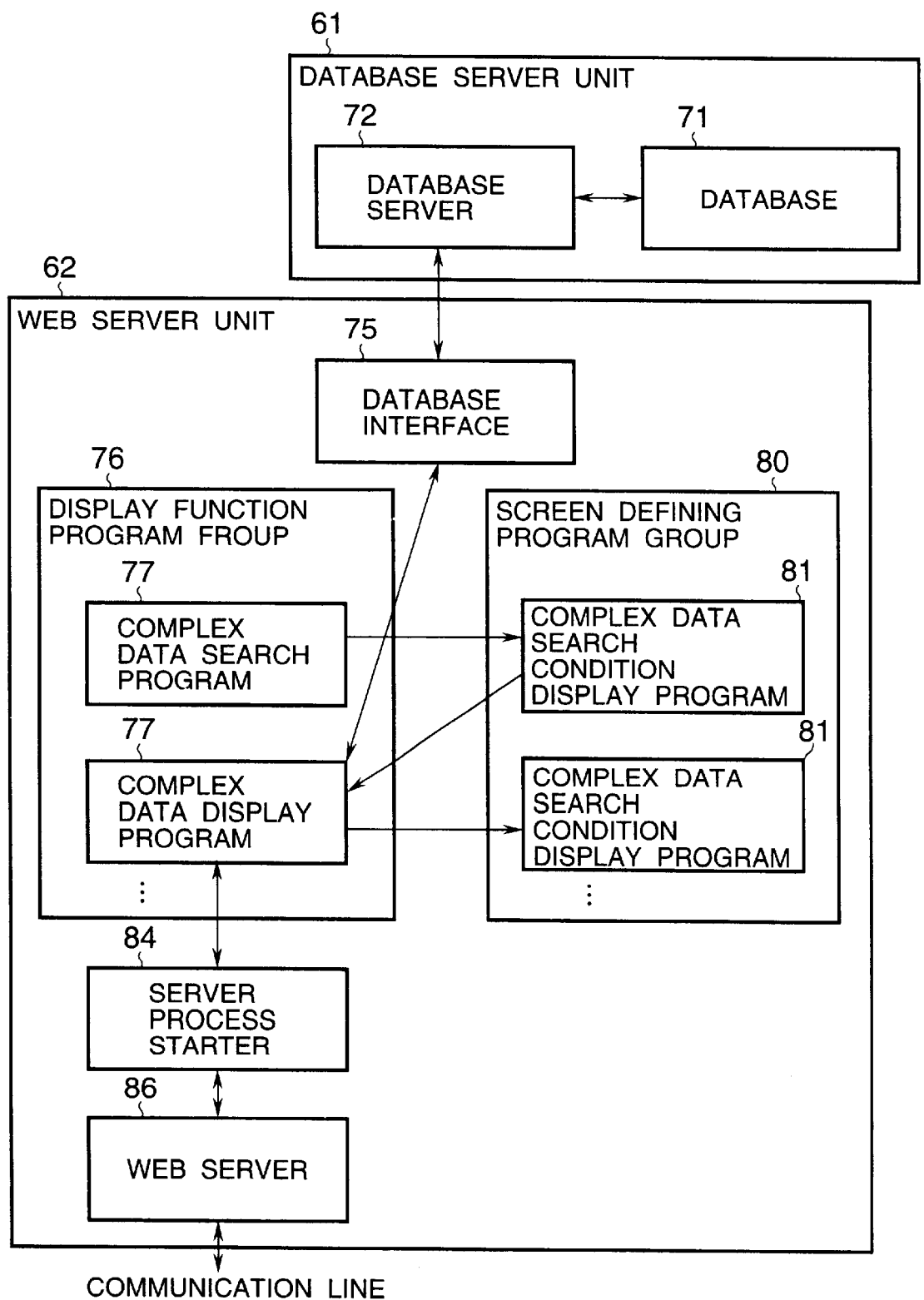
FIG. 6 is a block diagram to show the composition of a database server unit and web server unit contained in the database access system representing the embodiment.

FIG. 5 is a block diagram to show the composition of a database access system of a first embodiment representing an application of this invention. FIG. 6 is a block diagram to show the composition of a database server unit 61 and web server unit 62 contained in the database access system.

In this embodiment, description will be given for a case where the internet client uses a web browser and the internet server uses a web server. This invention also applies, however, to other combinations of internet servers and internet clients connected through a common protocol.

In this embodiment, a database server 72 communicates with a client unit 65 through a web server 86. The client unit 65 uses a web browser 66. Screen displays necessary for operation and input/output are stored in a file of screen defining programs under the management of the web server 86.

A user enters a URL for the start screen from the web browser 66 on a client unit 65. Then, the web brouser 66 sends, through the communication line 63, a message requesting the web server 86 on the web server unit 62 specified by the URL to transfer the start screen defining file specified by the URL.

In response to the request, the web server 86 transmits the requested screen defining program to the web browser that has sent the request. The web browser 66 interprets and executes it, and a display specified by the screen defining program is given.

If an operation object is manipulated on the screen, the web browser 66 sends a message to the web server 86 requesting the latter to carry out a corresponding server process. On receipt of the request for a corresponding server process, the web server 86 assigns the task to a server process starter 84. The server process starter 84 starts an appropriate server processing program.

In this invention, the server processing program has display function programs 77 corresponding to each necessary display function contained in display function program group 76. The display function program group 76 is an assembly of the programs that are necessary for achieving display functions used in this invention. The screen function program group 76 contains, for example, a complex data search program and complex data display program.

Each display function program 77 has a screen defining program 81 to display processing results contained in screen defining program group 80. The screen defining program 81 contains, for example, a complex data search screen program, and complex data search result display program. The screen defining program 81 has various functions, for example, to elicit a subsequent display function program 77. As seen above, with this invention, operation proceeds in order by running programs stored in the display function program group 76 and in the assembly of screen defining program group 80 sequentially as requested.

For example, when the user presses a search button on a search screen, a display function program 77 to support a search is started, and a list of search results is given on the screen. Then, when the user selects one listed on display, a further display is given to provide a more detailed result, and so the operation proceeds.

The display function program 77 communicates with a database interface 75 as needed, and writes or reads data into or from a database 71 on the database server unit 61 through the database server 72 on the same unit.

It is possible for a database server unit 61 and a web server unit 62 to be integrated in the same hardware unit. However, because access to a database commonly occurs through a network, consideration of such arrangement will be excluded from this embodiment. It is also possible for a database server unit 61 to be connected to a number of web server units 62, to distribute a load to those web server units 62 thereby to reduce a load per web server unit. Connection of the database server unit 61 with the web server unit 62 may occur through a communication line 3, but in this embodiment the connection in question occurs through a proprietary dedicated line.

The mechanism by which to allow the web server to boot a program registered on the server side of web server may be sought in CGI, ASP (Application Service Provider) proposed by Microsoft Co., Java Servlet proposed by Sun-Microsystems Co., and various others, and any mechanism may be applicable to this invention. In this embodiment, however, Java Server Pages (JSP) proposed by SunMicrosystems Co. will be employed as such a mechanism, because it is particularly suitable for this invention where a display giving results obtained through access to a database is presented as a result of the processing.

JSP provides language specification to write a server processing result as a variable into HTML or a language to define displays for web browser, and also to write the server processing void itself in Java language, and rules to implement the mechanism to carry out the server process described in the JSP. In this embodiment, the screen defining program 81 corresponds with the HTML-described part, while the corresponding display function program 77 with the server process describing part.

Common programs related with functions independent of the display functions are stored in a database interface and prepared also in Java language. They are commonly utilized by each of the display function programs 77. For example, to make a search using the tables specified by this invention like those shown in FIGS. 11, 12 and 31, a program which receives search conditions as parameters and makes search is stored in the database interface 75. Another program which, in combination with the above program, executes the processes as indicated in the flow charts of FIGS. 14, 15, 16 and so on, is assigned to the display function program 77.

A program written in a conventional language is converted by a compiler into a machine language whose legibility is dependent on the CPU, stored in a file having a format dependent on the operating system, to be executed. Because of this, if the CPU or operating system is exchanged for another, the program must be complied anew. However, whenever such exchange occurs, various other problems may arise due to variety of compiler or library. In contrast, a program written in Java is converted by a compiler into an intermediate language whose legibility is independent of the type of CPU and operating system. Namely, specification of the operations is neutralized even at this early stage. Accordingly, with this invention, it is advantageously possible by describing all programs in Java to make the compiled programs therefrom compatible with any CPUs and operating systems.

The database interface contains not only common process to all the units but also process necessary for the direct interface with the database server. To execute the latter process, various database server manufacturers prepare software packages called database drivers having a standardized format called Java Database Connectivity (JDBC) for the database servers provided by them. The display function programs of this invention have been prepared such that they include a database driver based on JDBC standard, and thus they can be connected to a variety of database servers without any modification required for the change.

FIGS. 7 to 10 are block diagrams of the arrangement of servers with respect to communication lines.

Figure 7:
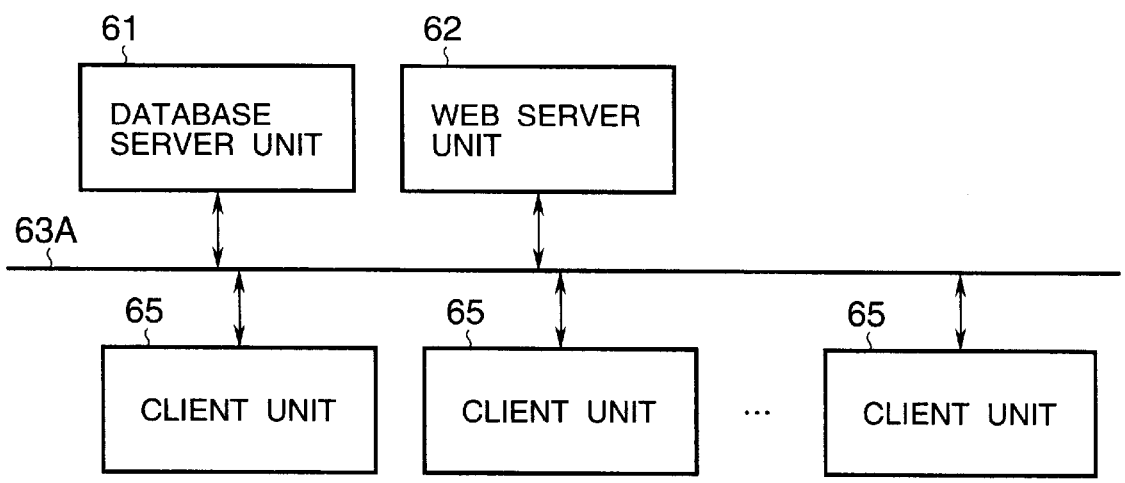
FIG. 7 is a block diagram to show the composition of a first example of the embodiment to indicate the servers in relation to a communication line.

FIG. 7 is an example where a database server unit 61 and a web server unit 62 are connected to all client units 65 which utilize the resources of the former units through a Local Area Network (LAN) 63A. This type of organization is suitable for the users who are limited in number, like employees in a company.

Figure 8:
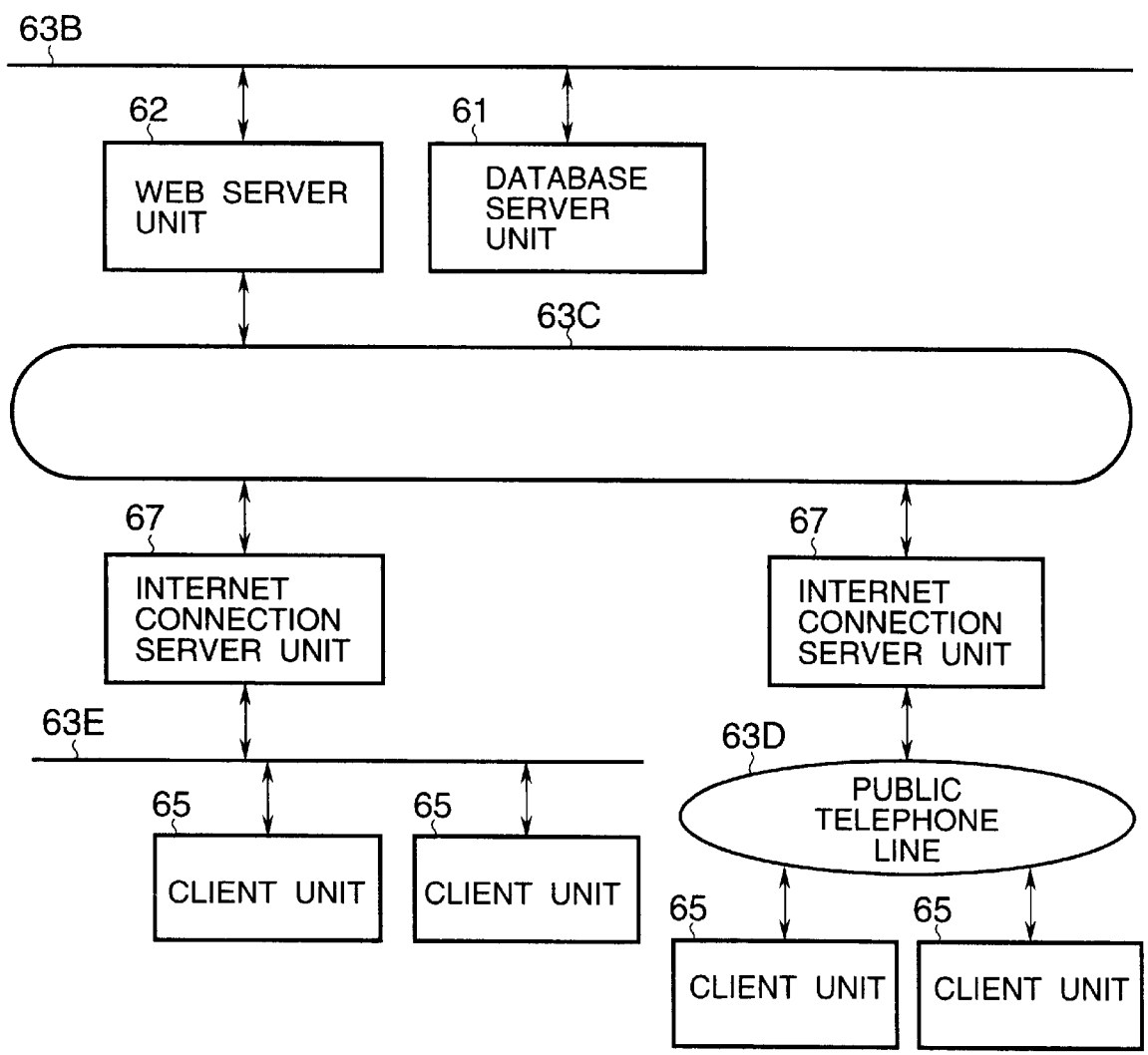
FIG. 8 is a block diagram to show the composition of a second example of the embodiment to indicate the servers in relation to communication lines.

FIG. 8 gives an example where a web server unit 62 is placed in the internet 63C, and the web server unit 62 is connected to a database server unit 61 through a LAN 62B.

Access from a client unit 65 to the internet 63C may occur directly. Alternatively, a single user may gain access to an internet connection server unit 67 provided by an internet provider through a public telephone line 63D, and then reach the internet 63C through the internet connection server unit 67. Or, a company or government department, if it has an internet connection server unit 67 in its LAN 63E, may reach the internet 63C through the LAN 63E and the internet connection server unit 67.

The organization as shown in FIG. 8 is suitable for a case where a service center distributes services to general subscribers.

Figure 9:
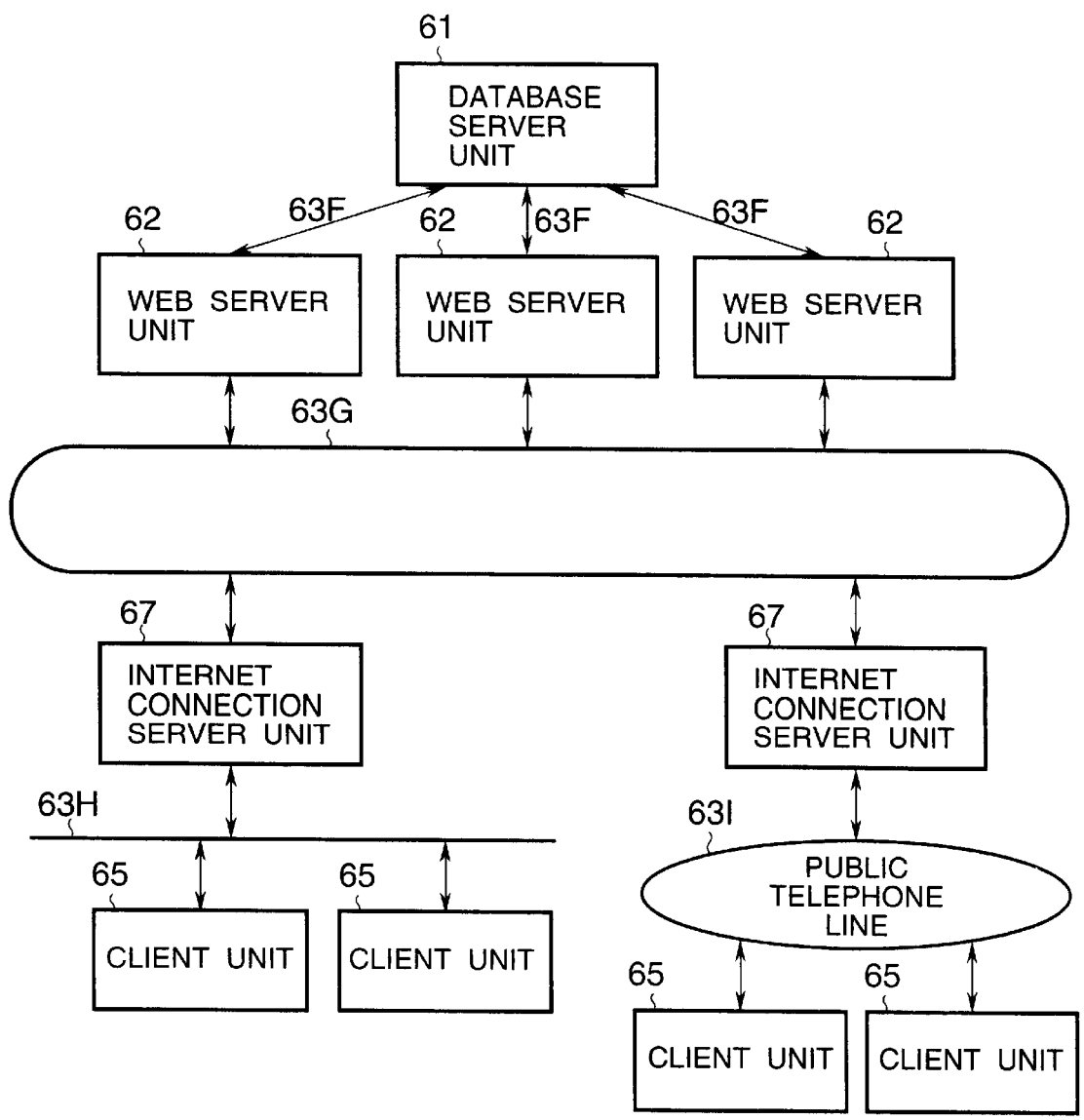
FIG. 9 is a block diagram to show the composition of a third example of the embodiment to indicate the servers in relation to communication lines.

FIG. 9 gives an example where a plurality of web server units 62 are placed over the internet 63G, and these units are connected to a single database server unit 61 through exclusive communication lines 63F. This organization allows the web server units 62 to stand in different locations to establish there as local service centers to provide services to local subscribers. Further, because the same database server unit 61 is shared by the plurality of service centers, maintenance of the database applies to all the centers.

Figure 10:
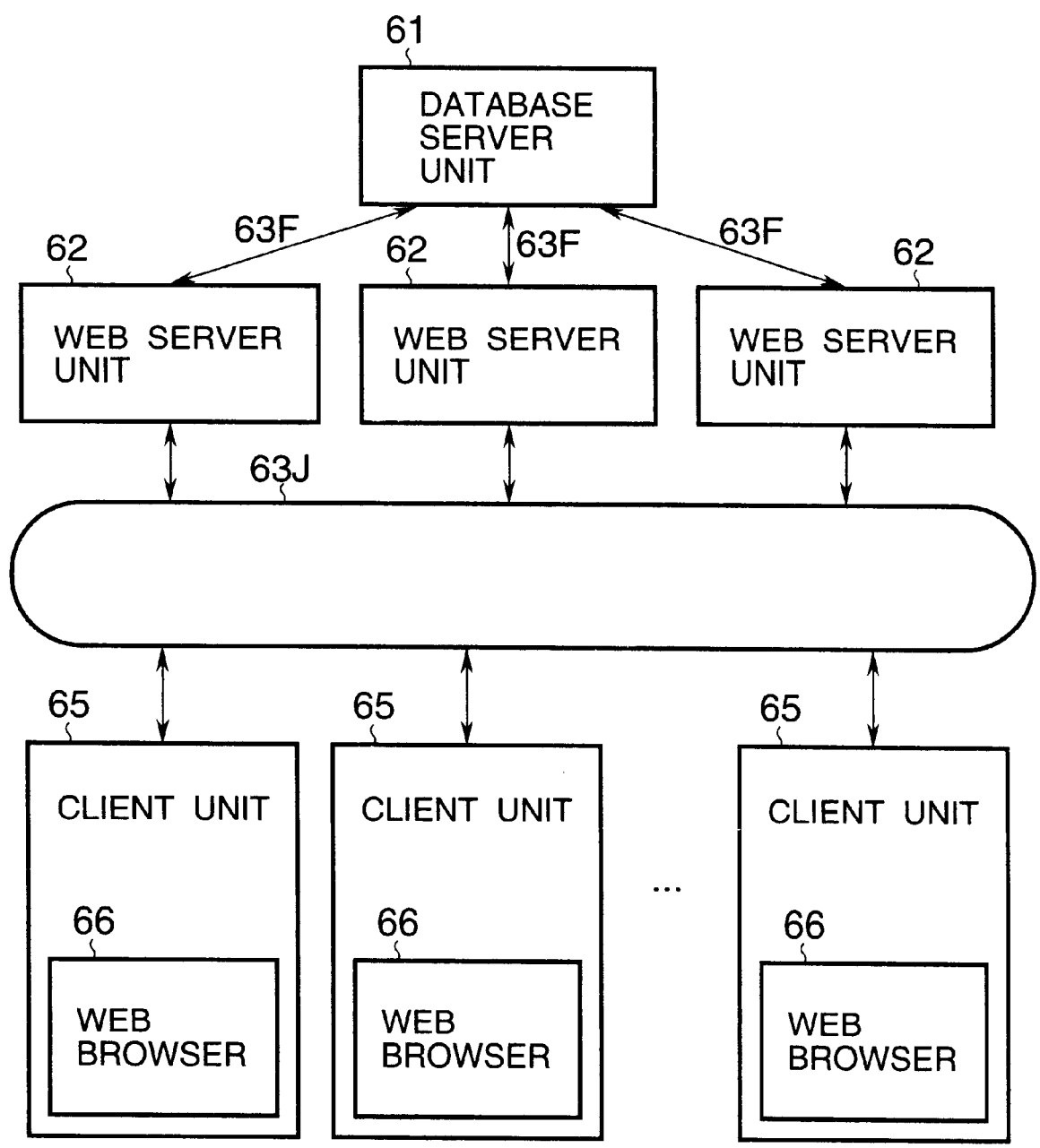
FIG. 10 a block diagram to show the composition of a fourth example of the embodiment to indicate the servers in relation to communication lines.

FIG. 10 is a simplified modification of the example given in FIG. 9.

In the following embodiments, description will be limited to systems incorporating relational databases, but this invention is not necessarily limited to systems based on relational databases as long as the type of data is determined for each table, and arrangement of data is determined in terms of the record of each table, and data can be specified in a table.

Figure 11:
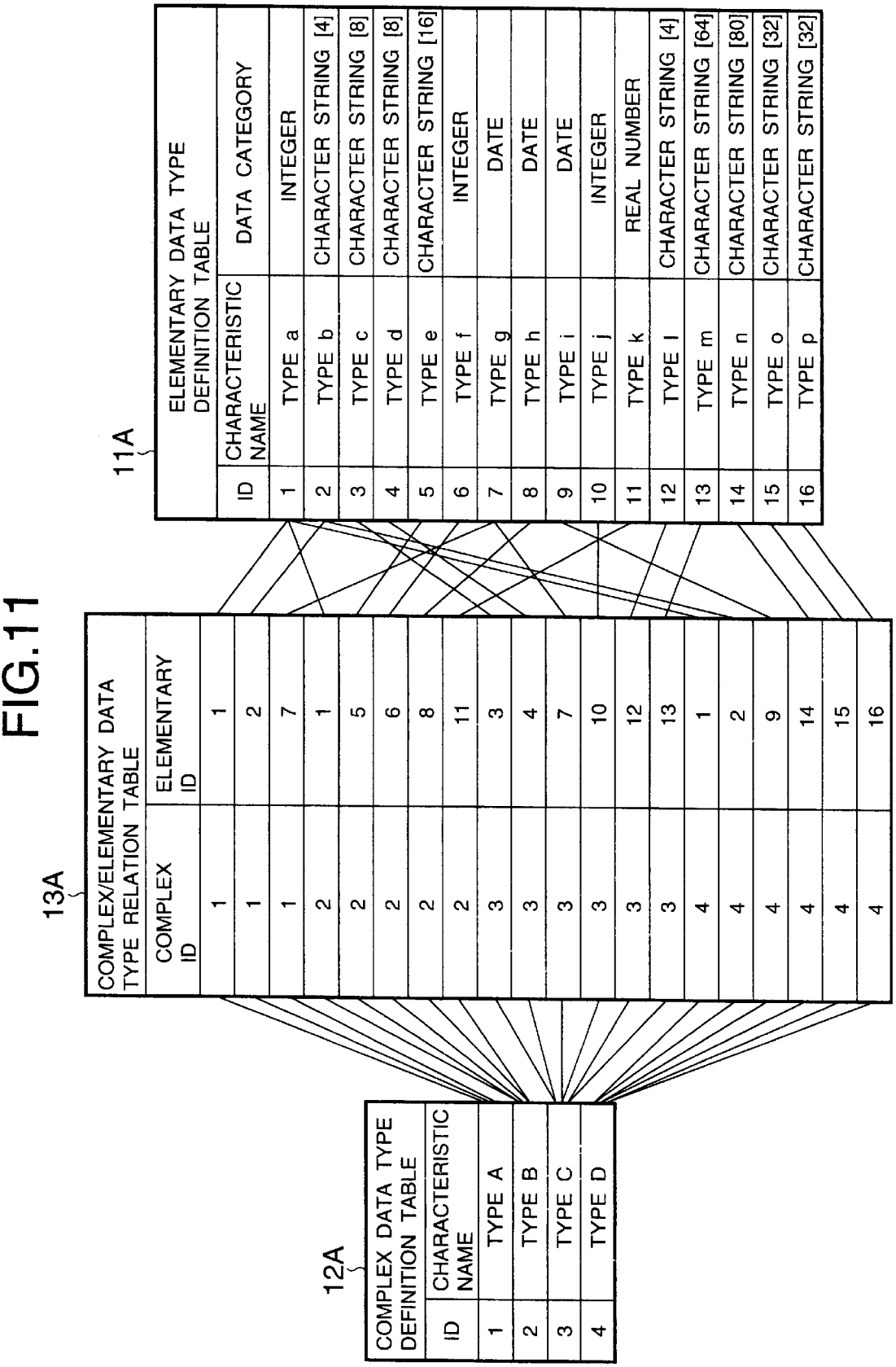
FIG. 11 is a first block diagram to show the composition of a database representing the embodiment.
Figure 12:
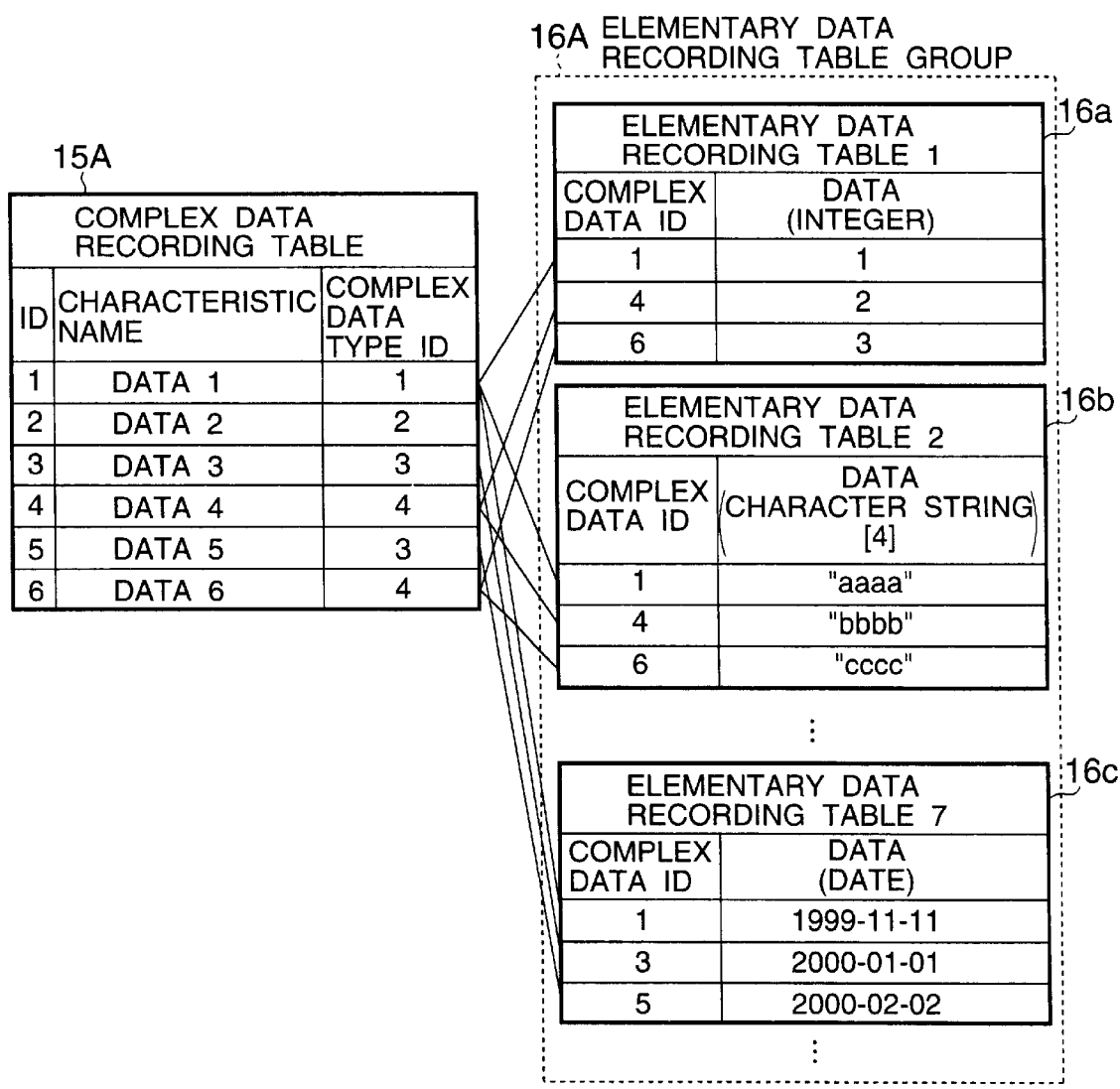
FIG. 12 is a second block diagram to show the composition of a database representing the embodiment.

FIGS. 11 and 12 show the structure of the database of this embodiment.

This embodiment is characterized by allowing the user to define or modify, for data complex comprising plural elements, a plural variety of compositions, not being required for directly defining the composition of a physical table or of column headings.

For this purpose, this invention prompts the user to define the data composition, using an elementary data type definition table 11 stored in an elementary data type definition table storage. This defines the type of various data to be stored in a database. The elementary data type definition table 11A includes, as column headings, at least ID to identify the elementary data type, and the data category. This embodiment further includes the characteristic name of elementary data type. The IDs of elementary data type listed in the elementary data type definition table 11A must be unique.

Next, the complex data type definition table 12A stored in a complex data type definition table storage stores the definitions of various data masses which will be presented to the user, after the definitions available in the elementary data type definition table storage 11 have been chosen. The complex data type definition table 12A includes, as column headings, at least ID to identify the complex data type. This embodiment further includes the characteristic name of complex data type. The IDs of complex data types arranged on the complex data type definition table 12A must be unique.

A record which is necessary for gaining access to the database is defined to represent a cluster of elementary data included in that record. Namely, a record is defined to represent a complex data type, while the complex data type is defined as a cluster of elementary data types included in that record. Relating an elementary data type with a complex data type is achieved by relating ID of the elementary data type with ID of the complex data type on a complex/elementary data type relation table 13A fetched from a complex/elementary data type relation table storage.

As seen in FIG. 11, in this embodiment, 16 elementary data types are defined in the elementary data type definition table 11A and four complex data types are defined in the complex data type definition table 12A. In the complex/elementary data type relation table 13A shown in FIG. 11, a complex data type "A" having ID of "1" is defined. This complex data type "A" is defined to be composed of three elementary data types (whose IDs are 1, 2 and 7). Similarly, a complex data type "B" having ID of "2" is defined to be composed of five data categories (whose IDs are "1," "5," "6," "8," and "11"). A complex data type "C" having ID of "3" is defined to be composed of six elementary data types (whose IDs are "3," "4," "7" "10," "12," and "13"). Complex data types "D" having ID of "4" are defined to be composed of six elementary data types (whose IDs are "1," "2," "9," "14," "15," and "16").

What has been described above concerns with the definition of data structure.

To feed individual data into the database on the basis of above definitions, it is necessary to use a complex data recording table 15A as shown in FIG. 12, preserve a data storage area in the database for each data category, and rules to implement the mechanism to carry out the server process described in the JSP for each elementary data type into the corresponding storage area within a real database 16A together with the ID code of the cluster of data. Namely, data are stored into data tables arranged by elementary data types, i.e. into an elementary data recording table group 16A serving as a real database.

The complex data recording table 15A includes at least IDs to identify complex data and other IDs to identify complex data types. This embodiment further includes the characteristic names of complex data. The elementary data recording table group 16A records the IDs of complex data to which an elementary data is connected, and data corresponding with the data category as defined in the data category definition table.

Access to individual data stored in the elementary data recording table group 16A is possible by specifying a data mass identification code i.e. an ID in the complex data recording table 15A, and a corresponding complex data type definition, by referring to the database definition information group 10. The complex data type is defined, as discussed above, by the data category definition table 11A, complex data type definition table 12A, and complex/data category relation table 13A.

Data to be stored in the database are entered into the complex data recording table 15A, and into a corresponding elementary data recording table group 16A which has been prepared to each elementary data type when the elementary data type has been introduced. The elementary data recording table group 16A includes elementary data recording tables 16a, b, c, . . . for all the elementary data types introduced. In FIG. 12, an example of the elementary data type definition table 11a is defined. The elementary data recording table 16a stores data classified to the elementary data type with ID of "1." The elementary data recording table 16b stores data classified to the elementary data type with ID of "2." The elementary data recording table 16c stores data classified to the elementary data type with ID of "7."

To actually enter complex data, it is necessary to present on display a list of elementary data types, and a space for entry through web browser 66, and, when data input is given, to record it into both the complex and elementary data recording table 15A and table group 16A.

Figure 13:
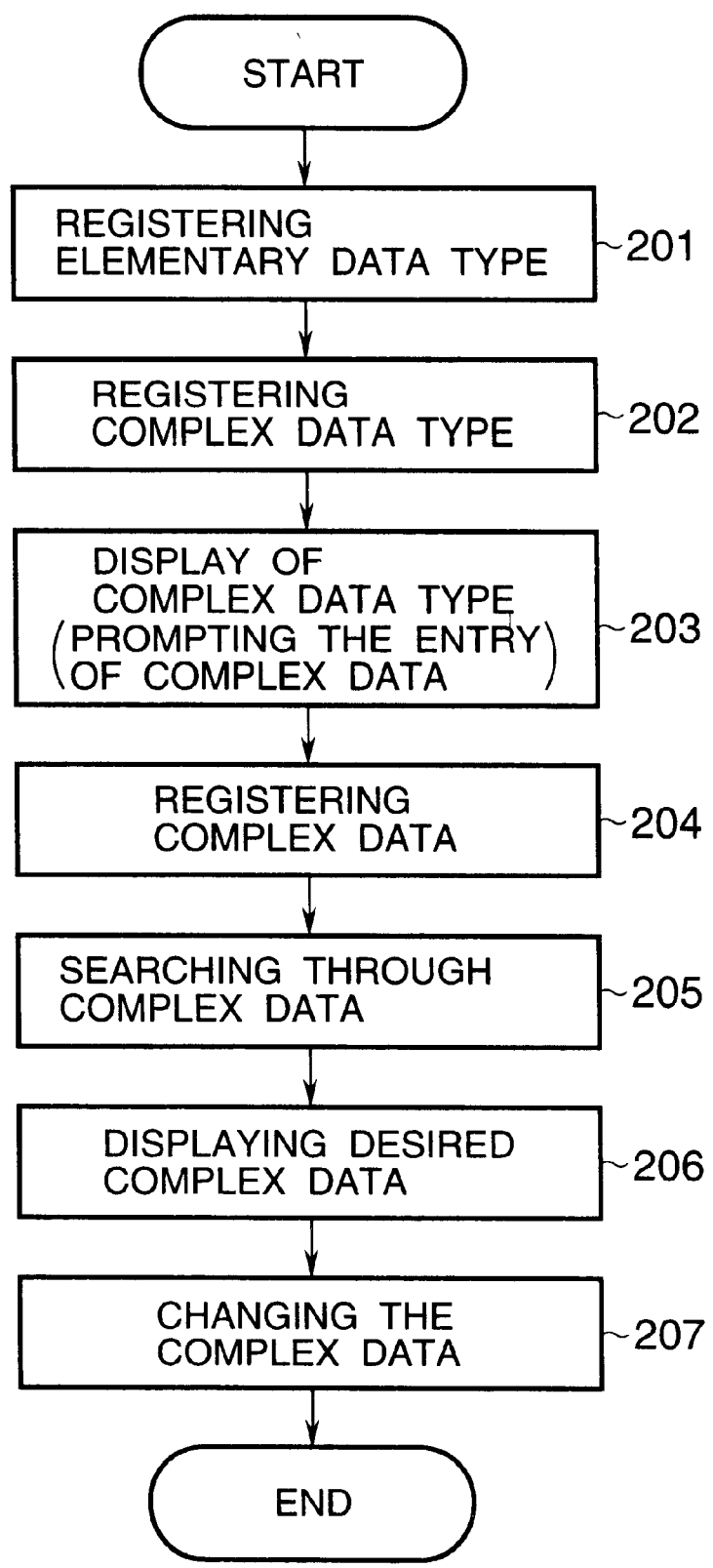
FIG. 13 is a flow chart representing the processes taken in the embodiment.

Basic operation steps necessary for registering and extracting data into and from a database having the above data structure using the present system will be outlined with reference to the flow chart of FIG. 13.

Firstly, at step 201 of FIG. 13, a necessary elementary data type is defined. At step 202, a complex data type is defined using the above definition.

Then, at step 203, to encourage the entry of complex data, the composition of complex data types is examined, and a display prompting the entry of complex data is given together with a space for the entry of elementary data. The user feeds appropriate input.

At step 204, complex data are registered based on the data fed in response to the display prompting the entry of complex data. At step 205, the system searches through the complex data, to locate desired complex data. At step 206, the system takes the desired complex data block, and display it. At step 207, the system may change the data block as required.

Next, the data handling steps of this figure necessary for utilization of the database will be further explained by following the flowchart prepared for each step. The substeps depicted in the following flow charts are executed by one of the display function programs 77 through the database interface 75.

Figure 14:
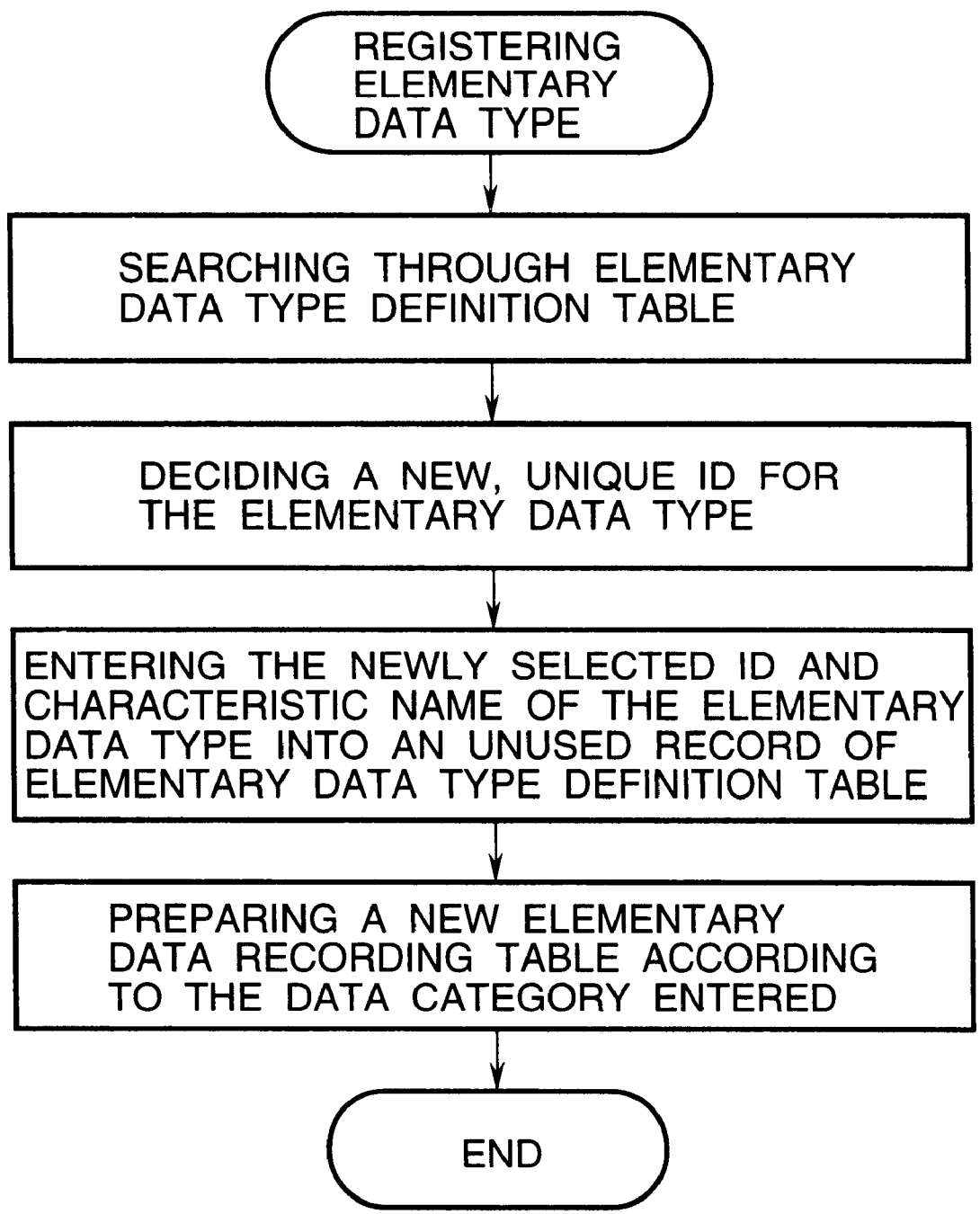
FIG. 14 is a flow chart representing the data handling steps of the embodiment taken for the registration of elementary data types.

Firstly, with reference to the flow chart of FIG. 14, the data handling taken at step 201 necessary for the registration of elementary data type will be described in detail below.

For this data handling, let's assume a data category of an elementary data type to be registered and its ID are entered. Firstly, the system scans through the elementary data type definition table 11A, and selects an ID for the new elementary data type such that it will not overlap with any existent IDs. Then, the system creates a new record in the elementary data type definition table 11A, and enters therein the newly selected ID of the elementary data type and characteristic name and data category entered. Then, the system prepares a new elementary data recording table according to the data category entered. The new elementary data type has now been registered.

With reference to the flow chart of FIG. 15, the data handling taken at step 202 outlined above will be described in detail below.

For this data handling, let's assume a characteristic name of complex data to be registered and a list of IDs of elementary data types constituting the complex data have been entered. Firstly, the system scans through the complex data type definition table 12A, and selects an ID for the new complex data type such that it will not overlap with any existent IDs. Then, the system creates a new record in the complex data type definition table 12A, and enters therein the newly selected ID of the complex data type and characteristic name entered. Then, the system creates a new record for each of the IDs of elementary data types entered, in the complex/elementary data type relation table, and records therein the newly selected ID of complex data type and ID of elementary data type entered. The new complex data type has now been registered.

With reference to the flow chart of FIG. 16, the data handling taken at step 203 necessary for presenting a display prompting the entry of complex data outlined above will be described in detail below.

For this data handling, let's assume an ID of complex data type is entered. This step requires a work data area as shown in FIG. 17 through which information of elementary data types constituting the complex data type to be handled is entered. The work data area will be described below with the complex data type 1 of FIG. 11 taken as an example, as handling proceeds through substeps shown in the flow chart of FIG. 16.

Firstly, the system scans through the complex/elementary data type relation table 13A, using a given ID of complex data type, and enters a list of the IDs of elementary data types included in the given complex data type into the work data area.

Then, the system searches, for each of the list, through the elementary data type definition table 11A using ID of the elementary data type, and finds its characteristic name and data category, and enters them into the work data area in connection with that elementary data type.

Finally, the system creates a screen defining program (shown in FIGS. 18 and 19) having a button through which to deliver, to the server process starter 84, a request for booting a display function program to write complex data into a database, on the basis of the data categories included in the ID of given complex data type, characteristic name of the complex data, and elementary data all entered based on the data in the work data area. The server process starter 84 transmits, through the web server 86, the screen defining program to a web browser 66 in the client unit 65 that has dispatched the request for process.

Figure 20:
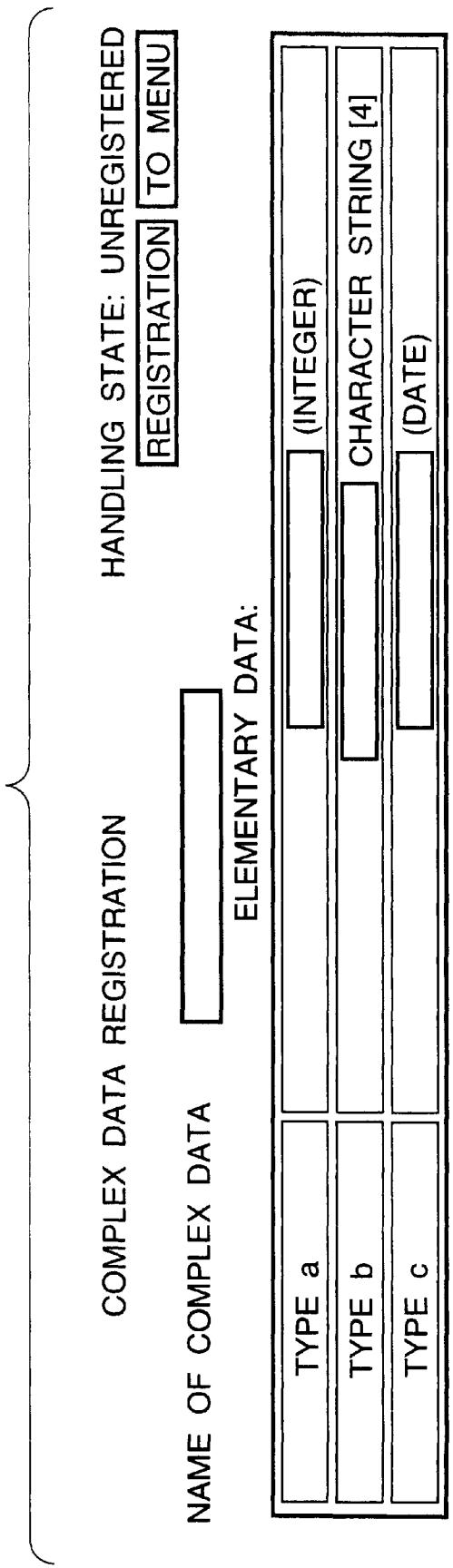
FIG. 20 is a diagram to show an example of a screen display on a web browser invoked by the program for defining the screen display for the complex data type entry.

FIGS. 18 and 19 show an example of such a program for defining a display for the entry of complex data type. FIG. 20 shows an example of display on web browser executed by this screen defining program.

With reference to the flow chart of FIG. 21, the data handling steps necessary for registering complex data using the data entered in response to the display booted by the program for preparing a display prompting the entry of complex data will be outlined below.

For this data handling, let's assume the ID of complex data type, and characteristic name of complex data, and an elementary data group constituting the complex data are given as input. Steps necessary for entering these data into the proper places of complex data recording table 15A, and elementary data recording table group 16A will be described with reference to FIG. 6 and others. Let's assume the elementary data group comprises a combination of the IDs of elementary data type and corresponding data value. The necessary steps are executed by one of the display function programs 77 at the database interface 75.

Figure 21:
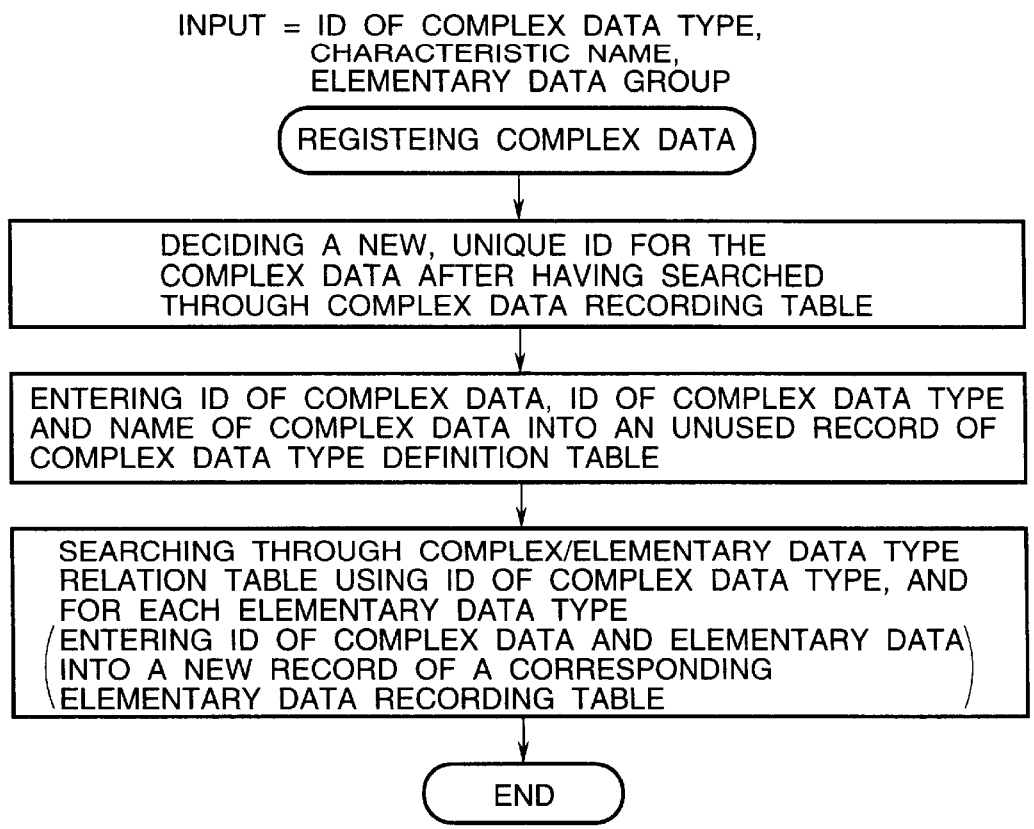
FIG. 21 is a flow chart to show the data handling steps of the embodiment necessary for the registration of complex data.

In FIG. 21, the system selects an ID such that it does not overlap with the existent ones. Next, the system enters the thus selected ID of complex data, the ID of the complex data type, and the characteristic name of the complex data, into a vacant record of the complex data recording table. Then, for each member of the elementary data group, data value and the ID of corresponding complex data is entered into vacant record in the elementary data recording table corresponding to the elementary data type ID.

With reference to the flow chart of FIG. 22, the data handling steps necessary for search of complex data will be described.

Operation will be described, for a case where a search condition is that a value of a certain elementary data block coincides with a particular value. However, a complex search condition may be implemented by introducing logical operators such as AND, OR, etc. The search condition may include not only a specific value but also a range, if the value is a number, or matching with the beginning, end, or arbitrarily chosen part of a string of characters. In this embodiment, let's assume the ID of elementary data type to be searched and the value with which the desired data must coincide are given as input. With reference to the flow chart of FIG. 6 and others, the steps necessary for properly registering the data and value into a complex data recording table 15A, and a table in the elementary data recording table group 16A will be described.

Figure 22:
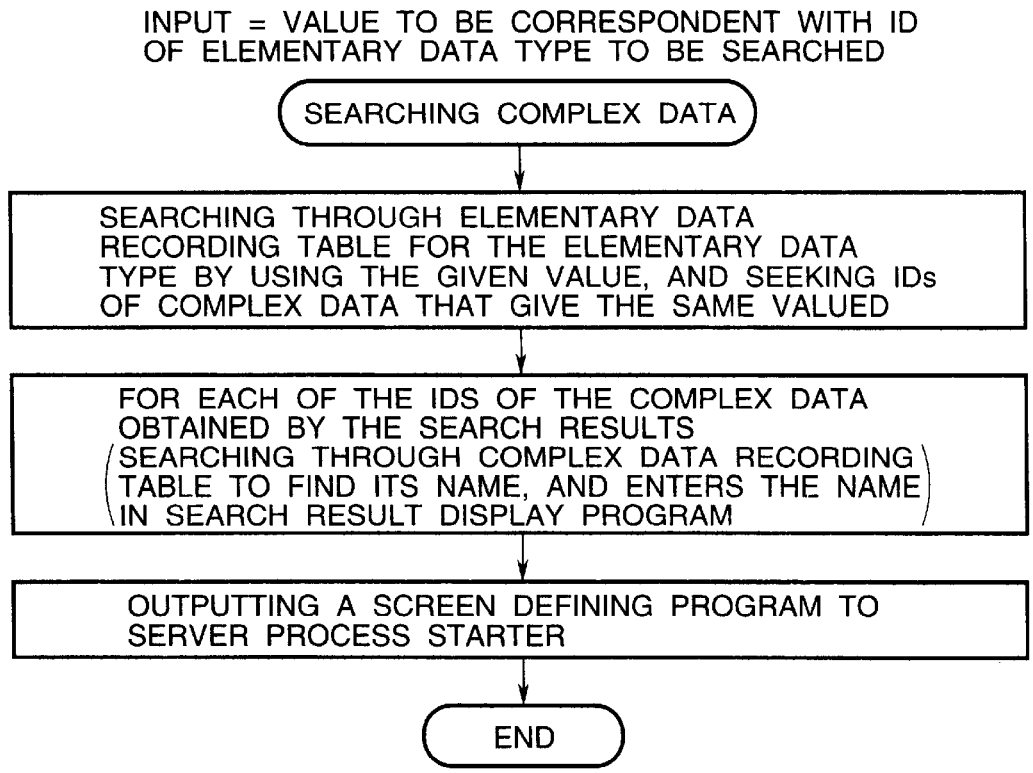
FIG. 22 is a flow chart to show the data handling steps of the embodiment necessary for search through the complex data.

In FIG. 22, the system chooses an elementary data recording table 20 corresponding with ID of the elementary data type, searches through the table using the value given as input, locates all the records having the same value, and obtains the IDs of complex data registered in those records.

Then, the system searches through a complex data recording table 19 for each of the IDs of complex data obtained as above, finds the characteristic name for each complex data type, and writes it into a program for defining a display to present the search result of complex data as shown in FIGS. 23 and 24. The system automatically creates the program in this manner.

Finally, the completed program for defining a display to present the search result of complex data is transmitted to the server process starter 84.

FIGS. 23 and 24 show an example of such a program for defining a display to present the search result of complex data generated by data process as shown in FIG. 22. FIG. 25 shows an example of display on web browser executed by this screen defining program.

With reference to the flow chart of FIG. 26, the data handling steps necessary for display of complex data will be described.

In this embodiment, let's assume the ID of complex data to be displayed has been given as input.

Firstly, at the first substep, the system searches through a complex data recording table 19 using ID of the complex data given as input, to find the ID of complex data type of the complex data.

Then, the system searches through a complex/elementary data type relation table 18 using ID of the complex data type thus found, to find the elementary data type included in the complex data type to be displayed.

For each of the IDs of the elementary data types thus obtained, the system searches through elementary data recording tables 20 using ID of the complex data type to be displayed, to find the values of elementary data, and write them into a program for defining a display to present the search result of complex data (FIGS. 27 and 28). The system automatically creates the program for defining a display to present the search result of complex data in this manner.

At the final step, the system transmits the screen defining program to a server process starter 6.

Figure 26:
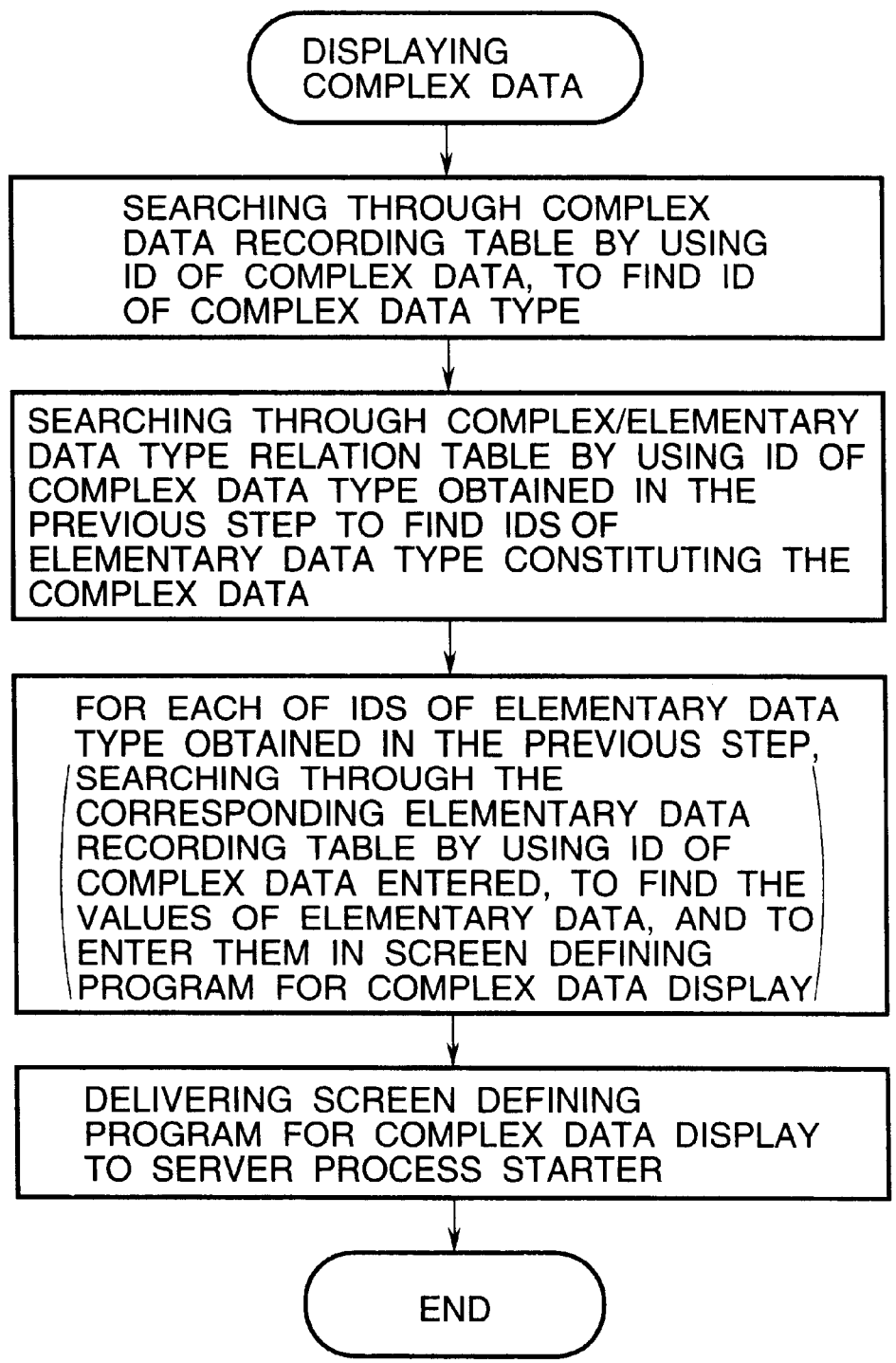
FIG. 26 is a flow chart to show the data handling steps of the embodiment necessary for display of the complex data.

FIGS. 27 and 28 show an example of such a screen defining program for defining a screen display to present the search result of complex data created by the data handling as depicted in FIG. 26. FIG. 29 shows an example of screen display on web browser executed by this screen defining program.

Figure 30:
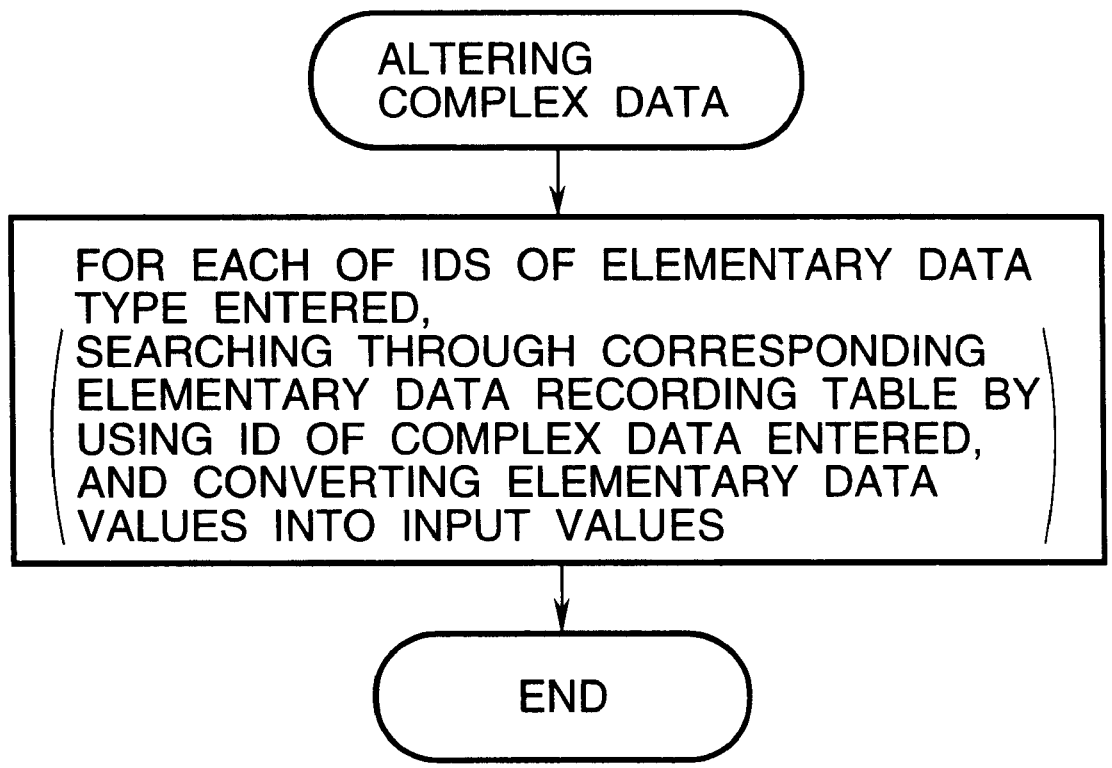
FIG. 30 is a flow chart to show the data handling steps of the embodiment necessary for changing complex data.

With reference to the flow chart of FIG. 30, the data handling steps necessary for changing complex data will be described.

In this embodiment, let's assume the ID of complex data to be changed, combination of ID of elementary data and the replacement values for each elementary data to be changed have been given as input. For each elementary data type ID given as input, the system searches through corresponding elementary data recording table using ID of the complex data given as input, to find relevant records, and exchanges the elementary data value of each record for the replacement value given as input.

Figure 31:
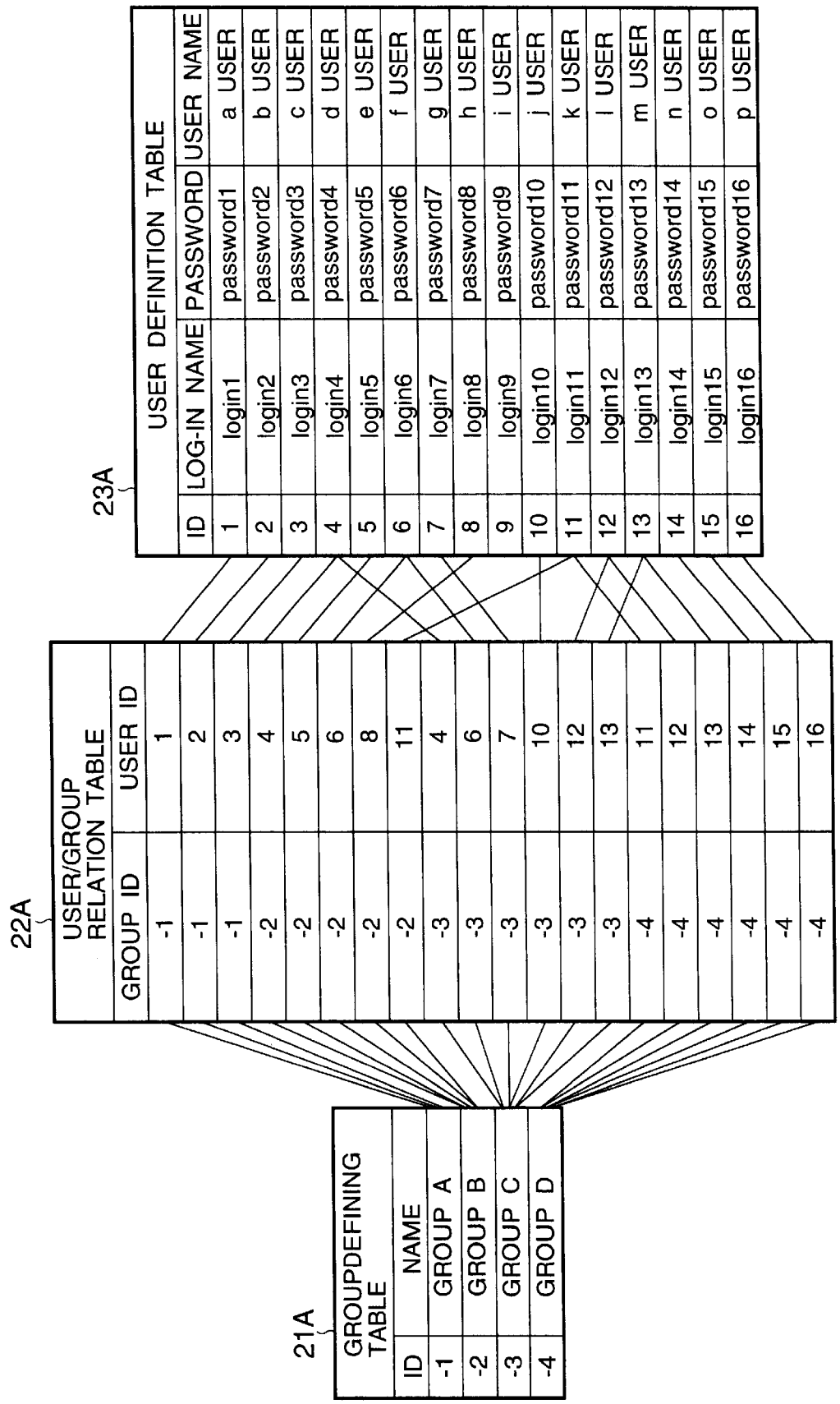
FIG. 31 is a first data composition chart of the embodiment to show the composition of database including information of users.

FIGS. 31 and 32 show the structure of a user information database which represents an embodiment of the present invention.

This user information database comprises a group definition table 21A stored in a group definition table storage, a user/group relation table 22A and group hierarchy definition table 22B stored in a structure definition table storage, and a users definition table 23A stored in a users definition table storage.

The users definition table 23A contains column headings for the name of users and others to define the users. The ID of users must be unique on the user definition table 23A.

The group definition table 21A contains column headings for group ID to identify groups, and the group names. The group ID must be unique on the group definition table 21A.

Either the user ID or the group ID takes a negative value, and the two IDs must not overlap with each other. Relating a user with a group is achieved by relating the user ID with the group ID on the user/group relation table 22A. Relation of a given user with a group is arbitrarily determined: one user may be related with plural groups, or one group may be related with plural users.

The group hierarchy definition table 22B finds groups in a parent-child relationship using their group IDs, and stores them in a hierarchical structure. In FIGS. 31 and 32, 16 users including user a to p are assigned to four groups including group A to D.

Figure 33:
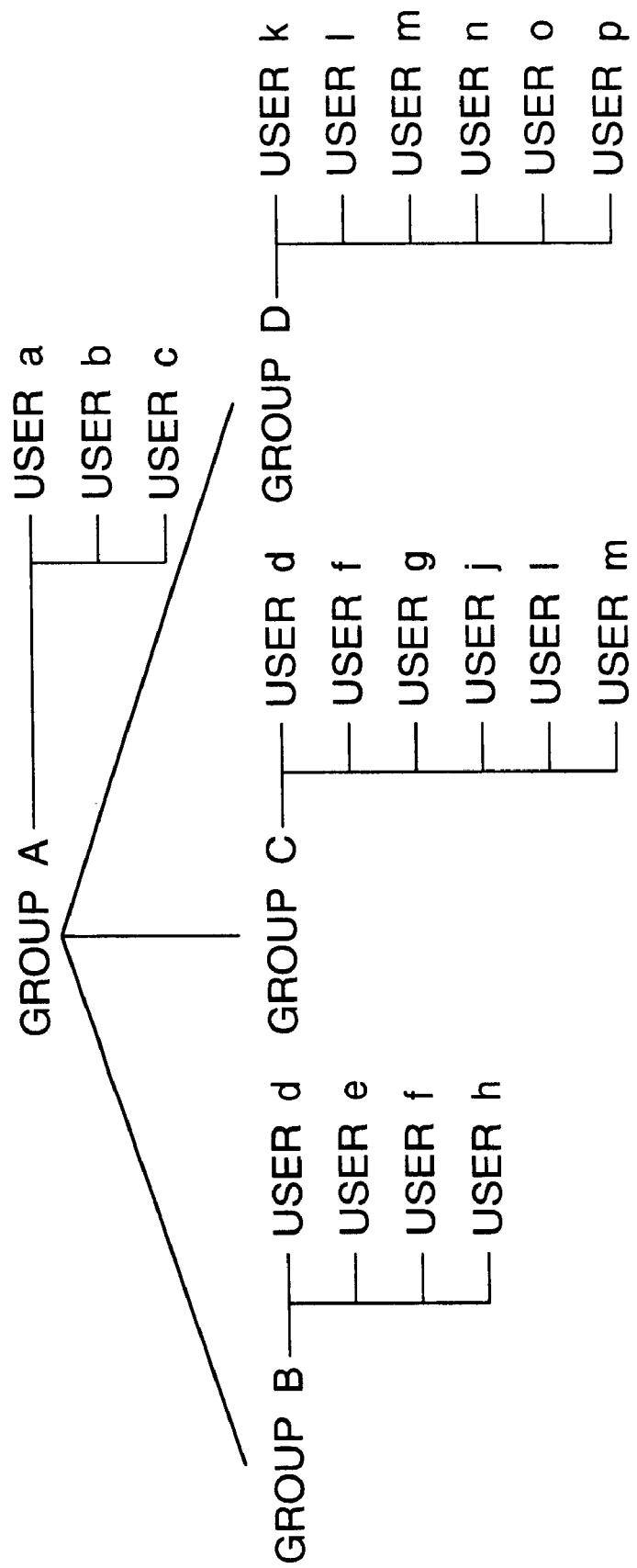
FIG. 33 is a tree diagram to show the relation of users with a group, and the lineage of groups.

The groups, and their member users, and the parent-child relationships of those groups are given in a tree-like structure of FIG. 33.

In FIG. 33, group A includes users a, b and c; group B includes users d, e, f and h; group C includes users d, f, g, j, i, and m; and group D includes users k, l, m, n, o and p. Groups B. C and D stand to group A in a child-parent relationship. A user may be assigned to a number of groups. User d is assigned to groups B and C.

The user can define the type of elementary data for his use, and the type of complex data using the above type. Moreover, he can define those types for a group.

FIG. 34 shows an elementary data type/owner definition table for recording relation between the elementary data type and access-permitted users (owners). FIG. 35 shows a complex data type/owner definition table 27 for recording the relation between the complex data type and the access-permitted users.

The column headings of the elementary data type/owner definition table concern with the ID of elementary data types and user ID or group ID. The column headings of the complex data type/owner definition table concern with the ID of complex data types and user ID or group ID.

In the tables depicted in FIGS. 34 and 35, and in FIGS. 31 and 32, distinguishing of user ID from group ID may be achieved by checking whether the ID number is positive or negative: if the number is negative, it is a group ID, and if the number is positive, it is a user ID. There are a number of blank spaces in user/group ID column of the tables, which indicates they are not assigned to any users or groups, and available to any users or groups.

The record of elementary data type/owner definition table corresponds with that of elementary data type definition table 11A, and thus the former table may be combined with the latter into one. Similarly, the record of complex data type/owner definition table corresponds with that of complex data type definition table 12A, and thus the former table may be combined with the latter into one.

Examples of the above embodiment will be given below. Namely, examples where a user utilizes the system of this invention by defining a concrete data category and complex data type will be introduced.

A first example concerns with a document mailing system incorporating the system of this invention as shown in FIGS. 36 to 39.

This example is an application of the above embodiment representing the present invention. In this example, a database manager implements a homepage named "E-mail" in the internet, collects data through the homepage, and turns them into a database using this invention, to be accessible to other users.

Figure 37:
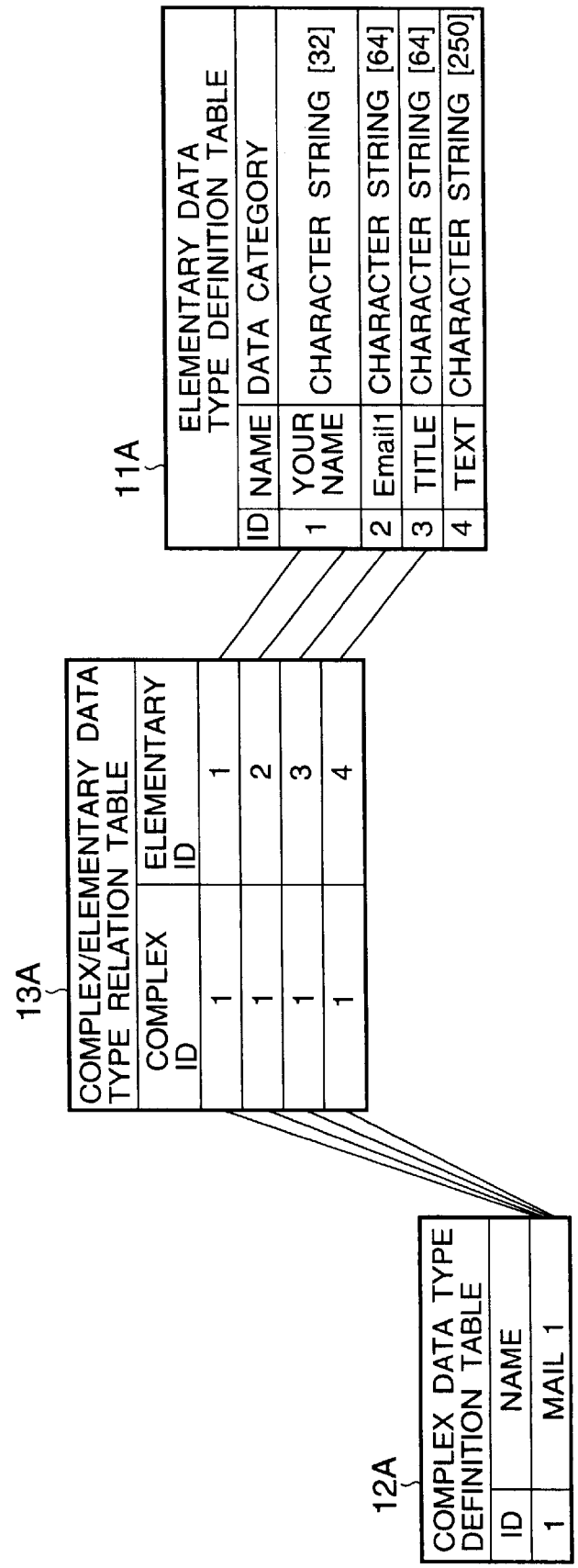
FIG. 37 is a data composition chart to show how data are distributed to the records of the complex data type definition table, elementary data type definition table, and complex/elementary data type relation table implemented in the embodiment.
Figure 38:
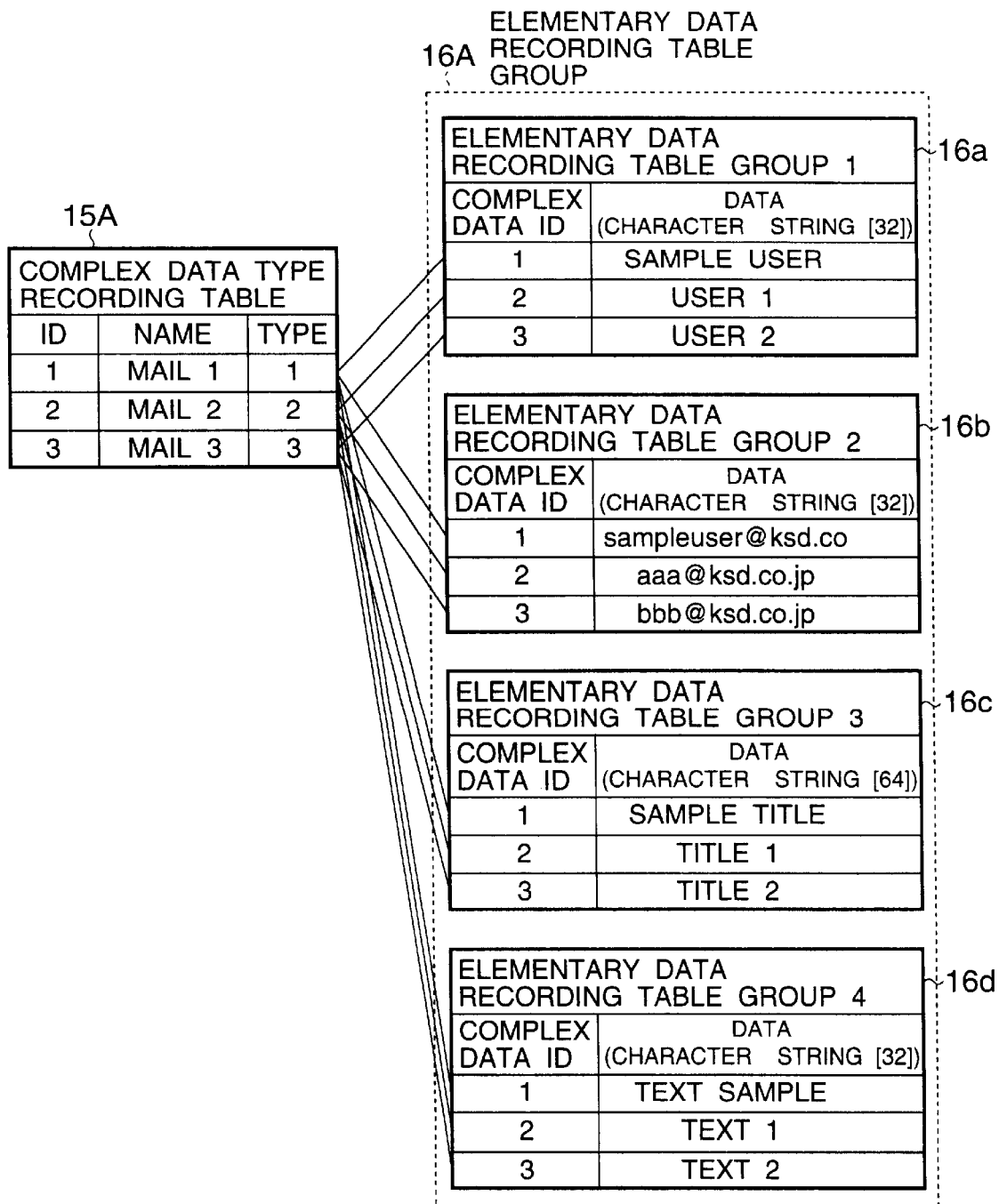
FIG. 38 is a data composition chart to show how data actually entered are distributed to a complex data recording table 15A and elementary data recording tables 16A.

FIG. 36 shows the homepage of this example which has slots for input which have been partially filled. FIG. 37 shows a complex data type definition table 12A, elementary data type definition table 11A, and complex/elementary data type relation table 13A, records of which are filled with the data collected in this example. FIG. 38 shows a complex data recording table 15A and elementary data recording table group 16A which are filled with data actually entered from outside.

In this example, if data are not treated as E-mail, but directly routed to a database, no notice of data arrival will be dispatched to the sender, or reply to data delivery will meet more or less difficulty.

To meet such situations, the database manager may install an automatic service program for server process on the database server unit 61, or on the web server unit 62 through which one can access to the database server 72. This program is to handle transmitted data automatically and periodically. This program periodically checks the entry of new data, and, if a new data block enters, modify it into an ordinary E-mail. Then, if the mail requires a reply and contains E-mail address of the sender in the input data, the program sends the mail to the E-mail address of the database manager which has been registered.

FIGS. 39 and 40 show an example where data entered as shown in FIG. 38 are modified into an E-mail.

This invention may be applied to not only E-mail but a form for user registration or for purchase order on a homepage. In this case, entry form may be prepared on the homepage without preparing entry form processing program on the server. There are people who have opened their homepage using a space for HTML programs provided by the internet service provider, but can not open entry form to receive input data from user who have accessed to their homepage, because they have not been authorized to register their own server processing program. Even such people can open entry form on their homepage utilizing this invention.

A customer communication management system based on the system of this invention representing a second example will be described with reference to FIGS. 41 to 43.

This example concerns with a system by which management memo describing inquiries, claims, requests and so on from customers regarding goods or services of a company or shop are turned into a database.

FIG. 41 shows an example of a display prompting data entry with data actually entered.

Figure 42:
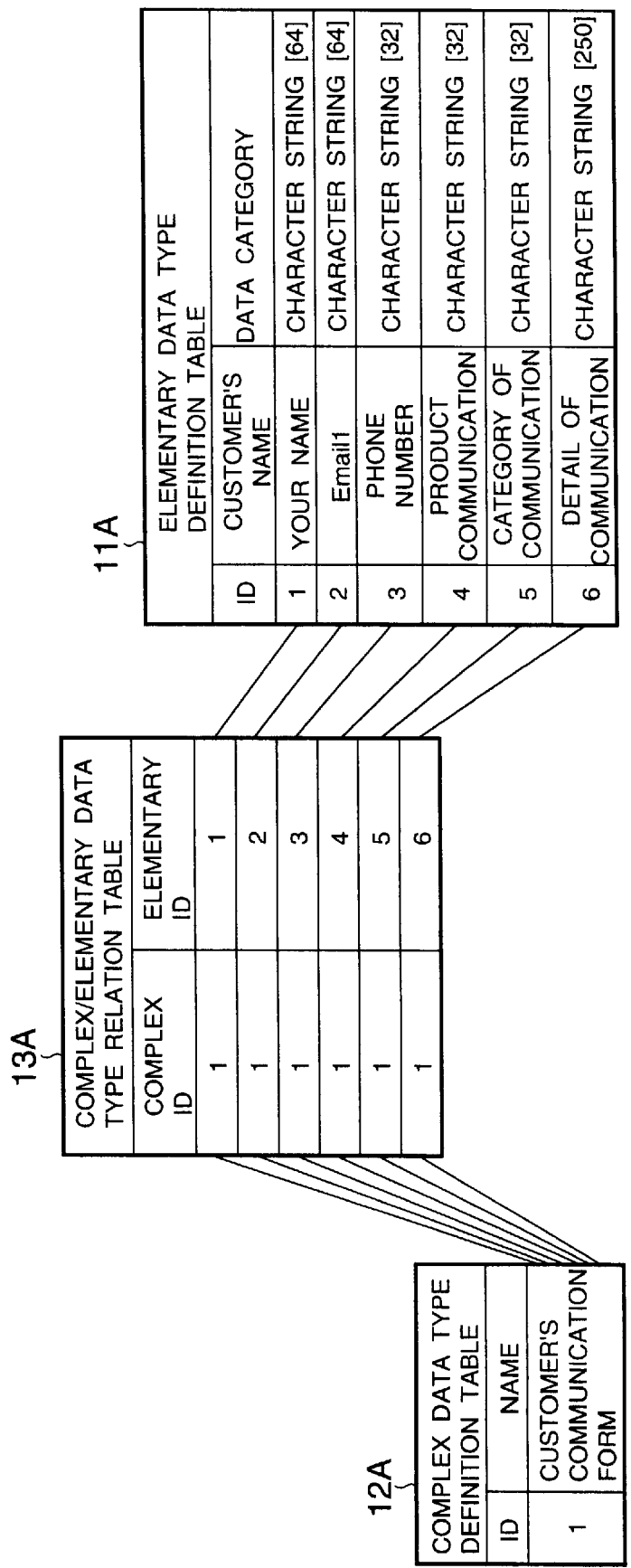
FIG. 42 is a data composition chart to show how data are distributed to the records of the complex data type table, elementary data type table, and complex/elementary data type relation table implemented in the embodiment.
Figure 43:
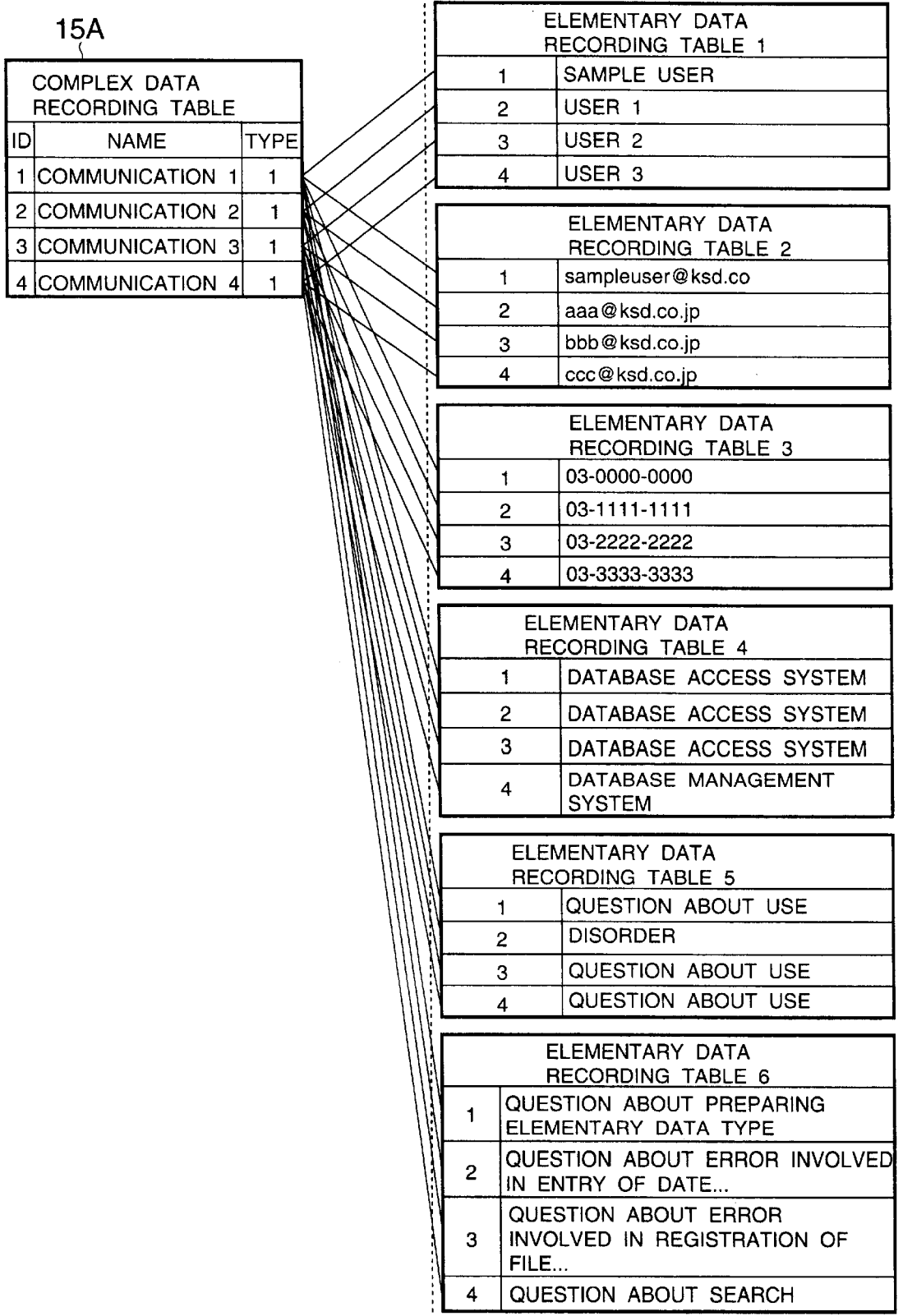
FIG. 43 is a data composition chart to show how data actually entered are distributed to a complex data recording sheet and elementary data recording sheet.

FIG. 42 shows a complex data type definition table 12A, elementary data type definition table 11A, and complex/elementary data type relation table 13A which are filled with the data actually entered in this example. FIG. 43 shows a complex data recording table 15A and elementary data recording table 16A which are filled with data actually entered.

As described above, the present invention is effectively utilized in this embodiment. The present invention is also made the most of in this example. Therefore, it is possible with this invention to build a database which may have various data structures, by only implementing a number of definition tables and not preparing any new programs for those structures, thereby to reduce the time, labor and cost required for the preparation of such programs, and to relieve the database builder of technical knowledge usually required for such database construction.

Figure 44:
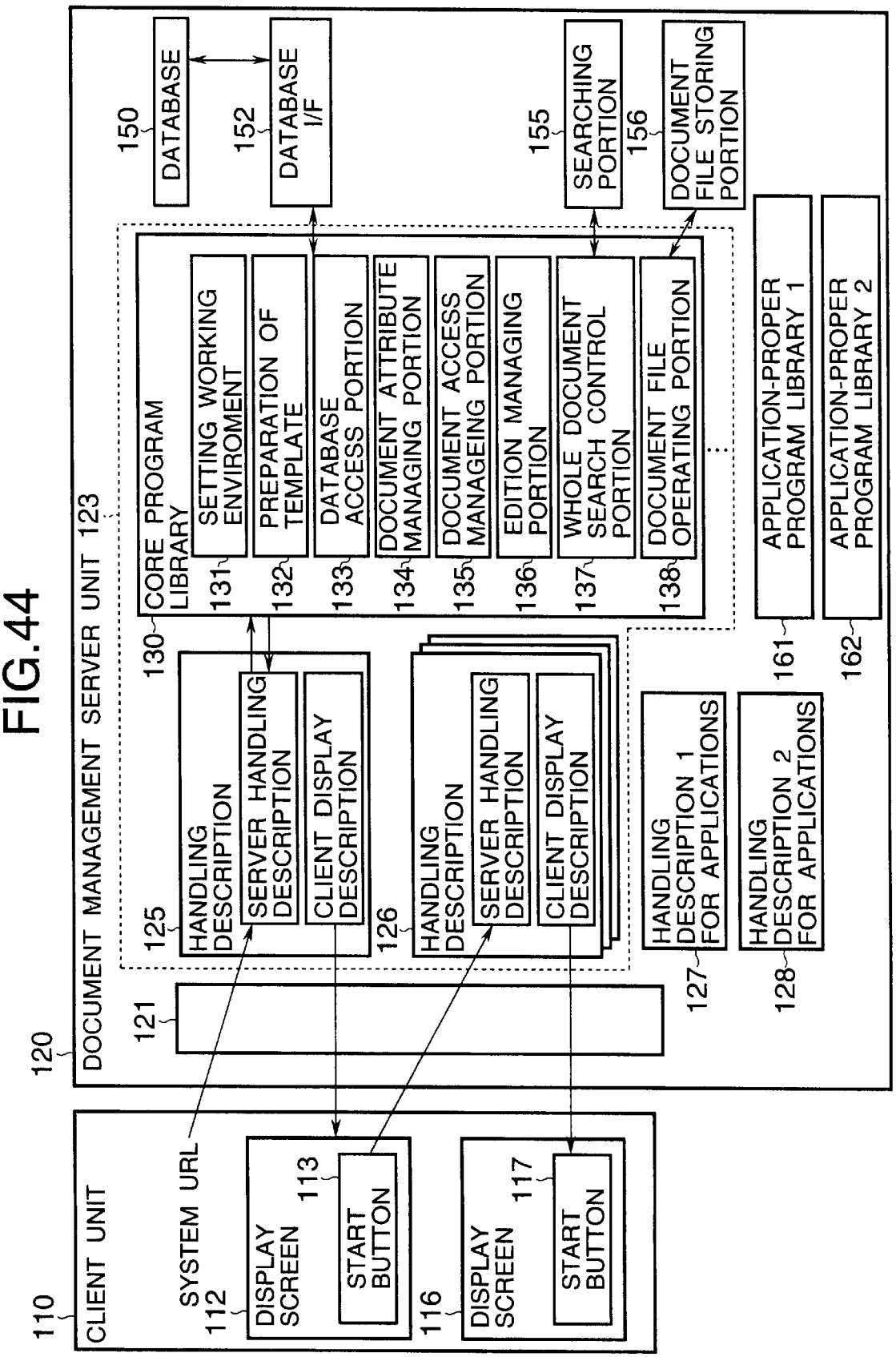
FIG. 44 is a block diagram to show the composition of a document management system incorporating the present invention.

FIG. 44 is a block diagram to show a document management system representing an embodiment based on this invention.

This embodiment comprises a document management server unit 120 and any arbitrarily chosen number of client units 110. The client units 110 are connected through a network to the document management server unit 120.

Each client unit 110 has a world wide web (WWW) browser. The client unit 110 gives a display 112 or 116 using the WWW browser. The WWW browser allows the user to achieve desired functions by pressing buttons on display, for example, starter button 113 or 117.

The document management server unit 120 contains a server program connecting portion 121, general document management portion 123, handling descriptions 127 and 128 for applications other than document management applications (document management supporting applications), program libraries 161 and 162 of such applications, database 150, database interface 152, searching portion 155 and document file storage 156.

The server program connecting portion 121 contains a WWW server program, or a middleware program to mediate messages from the WWW browser requesting handling to be executed by programs other than WWW server programs. The middleware program is contained in a JSP execution managing portion of websphere of IBM, USA, or of Servlet execution managing portion. These middleware programs are executed too, when a display screen of the client unit 110 is provided by the document management server unit 120.

The general document managing portion 123 contains a core program library 130 comprising various application programs as indicated by numbers 131 to 138, and handling descriptions 125 and 126 which are programs to execute various processings with client units 110.

The core program library 130 contains, in an document management program group, a document attribute managing portion 134, a document access managing portion 135 and edition managing portion 136. The core program library 130 further contains a keyword search control portion 137 to control a searching portion 155 which also serves as a general searching engine, accessing to the document file storage 156 through a document file operating portion 138. The same library further contains a database access portion 133 to access, through an database interface 152, to the database 150 serving as a general database.

The operation of this embodiment will be given below.

To receive a desired function, a user operates his client unit 110; then WWW browser on the client unit 110 sends a message to the document management sever unit 120, requesting it to boot a document management program thereon.

In the document management server unit 120, the server program connecting portion 121 receives the message, selects an appropriate handling description 125 in response to the message, and runs it. In response to the server handling description, nominated document management programs, for example, programs with numbers 134 to 136 in the core program library 130 or other programs are put into action. The activated programs execute requested handling actions. To display the handling result on the client unit 110, a display program to give the handling result on display is created according to the display-for-client description in the handling description 125, and the program is transmitted by the server program connecting portion 121 to the client unit 110 in question. The program is executed on the client unit 110, to give a display presenting the result of requested handling. An example of such a display program is shown in FIGS. 45 to 47.

Such a display program will give, for example, a display screen 112. The display screen 112 may include a button 113 to boot up a program necessary for achieving a related function.

Then, the user places a cursor of a pointing device such as mouse, on a starter button 113 on the display screen, and presses the button 113 for activation by clicking the mouse button. Then, the display program created by the document management server unit 120 and transmitted to the client unit 110 detects the press. Immediately, a message requesting the booting of a server program specified by the activated starter button 113 is sent from the client unit 110 to the document management sever unit 120.

On receipt of the message, the document management server unit 120 takes a handling action as requested. For example, the unit may go through handling descriptions 126 to a document attribute managing portion 134 in the core program library 130, and instructs it to search for documents whose document management data have a specified value. Or, the unit may instruct the keyword searching portion 137 to search for documents having a specified string of characters.

The result of requested handling may be displayed on the client unit 110 through the intervention, for example, of handling descriptions 126, as in the foregoing handling by the handling descriptions 125 or thereafter. For example, the handling result may be given on a display screen 116. If the request concerns with search of documents, the sought documents may be shown as a list on the display screen 116 on the client unit 110.

It is also possible to allow the user to proceed to next operations on the same display screen 116. For example, the system may achieve a series of document management operations consisting of allowing the user to choose a specific document from such a list as described above on the client unit 110, and to view the document management data in the document management server unit 120.

Here, application of the first invention specified here in this embodiment will be given below.

In this embodiment, the first invention is used for management of document attributes handled by the document attribute managing portion 134, or document search handled by the keyword search control portion 137 and document searching portion 155.

This embodiment introduces data categories such as integer, real number, character string, etc. The data category specifies the type of data stored in a database 150, or in a database of the document file storage 156. The category also includes those handled by common computer languages such as FORTRAN, COBOL, and C.

Data blocks belonging to a same basic data category and having a specified size are prepared. An arbitrarily chosen number of such data block units is given a specific name, defined as an attribute type, and stored in an attribute type master. In this embodiment, the size of a file is expressed in bytes, but may be expressed in other ways. For example, for a document file, it is possible to use, for the definition of the file, an attribute type comprising a number of data related with data type, size, etc., like path+size+name+extension. The attribute type, once it has been defined, must not be changed. Only before it is not actually used, it may be deleted. By defining the attribute type as above, it will be possible to effectively handle (retrieve and so on) desired files, because plural files are frequently handled in a group.

It is also possible to pick up an attribute from those stored in the attribute type master, give a specific name to it, define it to a file, and store it in the attribute type master. Because the attribute may be named freely, it is possible to define type of a document file easy to understand. The attribute may be used for search of document files.

It is further possible to pick up a desired number of attributes from the attribute master, collect them into a group, give a specific name to it, define it as a document type, and store it in a document type master. Once a document type is thus produced, only addition of a new attribute is permissible. Only before it is not actually used, it may be deleted. This document type may be used for search of document files.

In the embodiment as described above, to prepare a document, the user choose a document type from the document type master, and defines a new document therewith. This also applies to the format documents to serve as a model. It is possible to attach a typical attribute to format documents, and to store the resulting format documents.

In this embodiment, a document has a mass of basic attributes necessary for achieving the functions provided by the core program library 130. Moreover, in this embodiment, a document is given a group of attributes by way of the document types defined and implemented by the supportive applications as described above.

In this embodiment, a document may be defined by a single document type. Or, it may be defined by a plurality of document types. This also applies to the format documents to serve as a model.

Further, in this embodiment, to facilitate the user to select an appropriate attribute value during preparation of a document, an attribute value master is implemented. The attribute value master determines the range of permissible values for each attribute, and stores it. The attribute value master does not permit the change of attribute, once it has been registered. The attribute value master permits the deletion of registered attribute, only when it is not used yet. The attribute master provides, when the user nominates an attribute, a group of the values assigned to the same attribute. Therefore, when the user enters the values of attributes to manage a document, he only chooses appropriate ones from among the group of attribute values, being relieved of a burden of entering the values through keyboard, and thus the work efficiency is improved.

The attribute to be defined may include, for example, a specific name such as "project." Or, it may include a document type having specific name such as "requested specification," or "estimate." Further, a document type of "requested specification" or "estimate" may further include "project" as the attribute. For the documents managed by this embodiment, one document type out of "requested specification", "estimate" and so on, may be implement ed. or a plurality of document types may be implemented to one document.

In the above example, the document type of "requested specification" or "estimate" may be used as a search key to search desired documents. With this system, it is possible to locate files grouped under different document types, as long as they have a common attribute. Thus, it is possible to search through a group of files having a document type of "requested specification" and another group of files having a document type of "estimate," and to pick up files having a common attribute of "project," using "project" as a search key.

Using the manner of this embodiment as discussed above, it is possible to effectively apply this invention. Because this system makes it possible to properly and quickly select attributes necessary for managing documents, time and cost involved in the work are reduced, and the resolution of search based on the attributes is improved.

Next, an example where this embodiment is modified so as to make user selection will be described.

Figure 1:
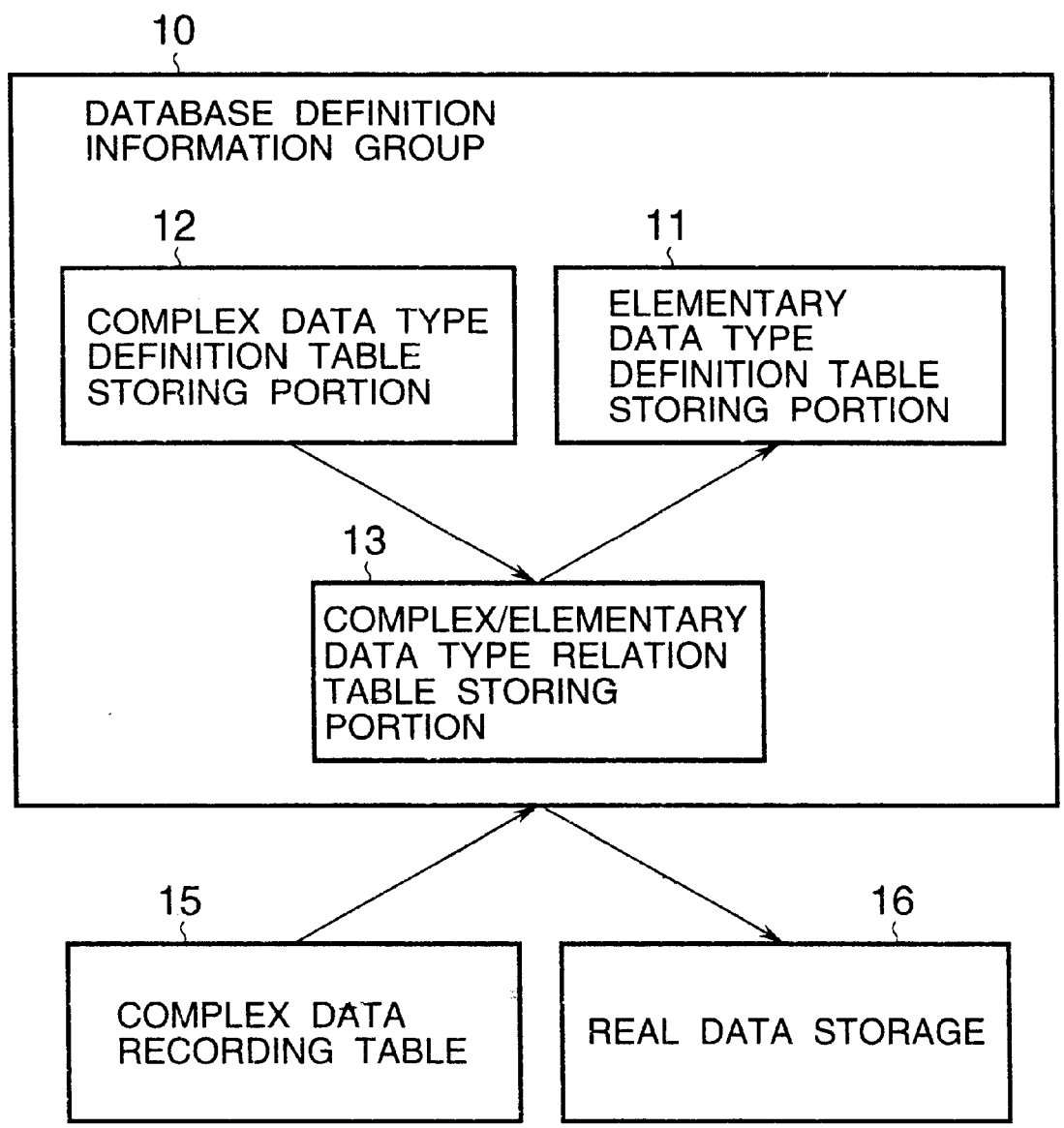
FIG. 1 is a block diagram to show the composition of a typical database access system representing the present invention.
Figure 2:
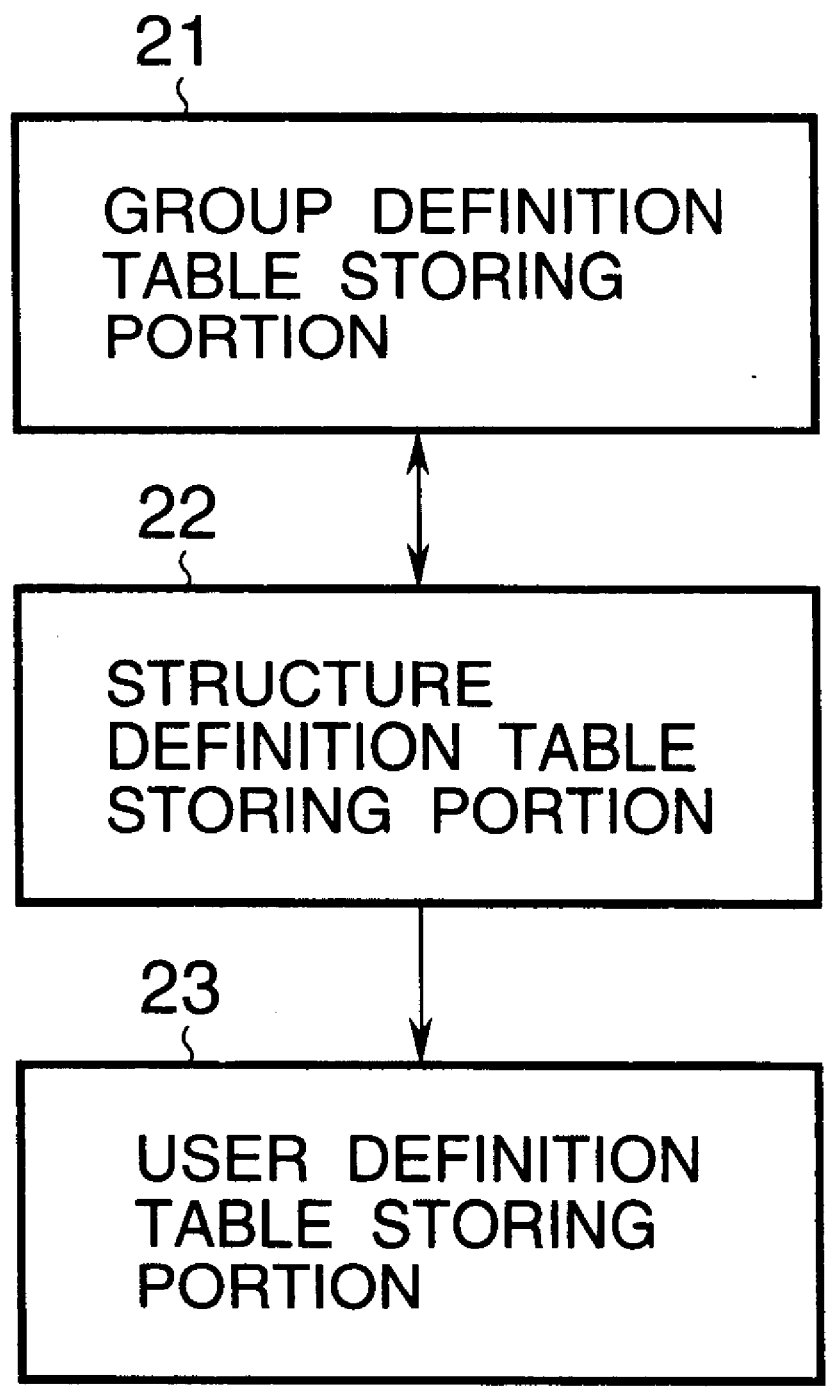
FIG. 2 is a block diagram to show the composition of a typical database access system representing the present invention whereby selection of users is achieved.
Figure 3:
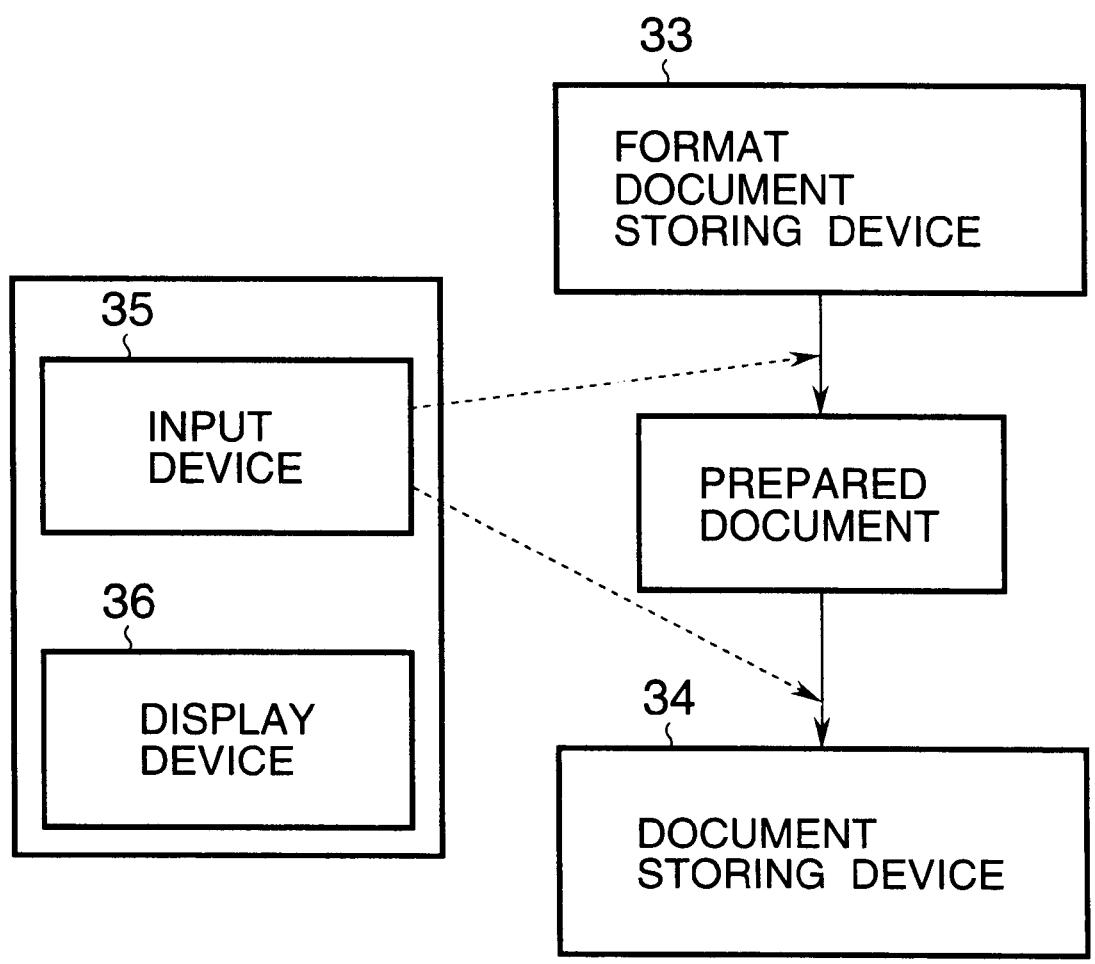
FIG. 3 is block diagram to show the composition of a document attribute management system to which the first invention is applied.

As discussed above in relation to FIG. 2, user selection is mainly achieved by a document access managing portion 135 on the basis of the criteria for access-permitted users. Document search performed by the keyword search control portion 137 and searching portion 155 is also similarly managed.

Figure 4:
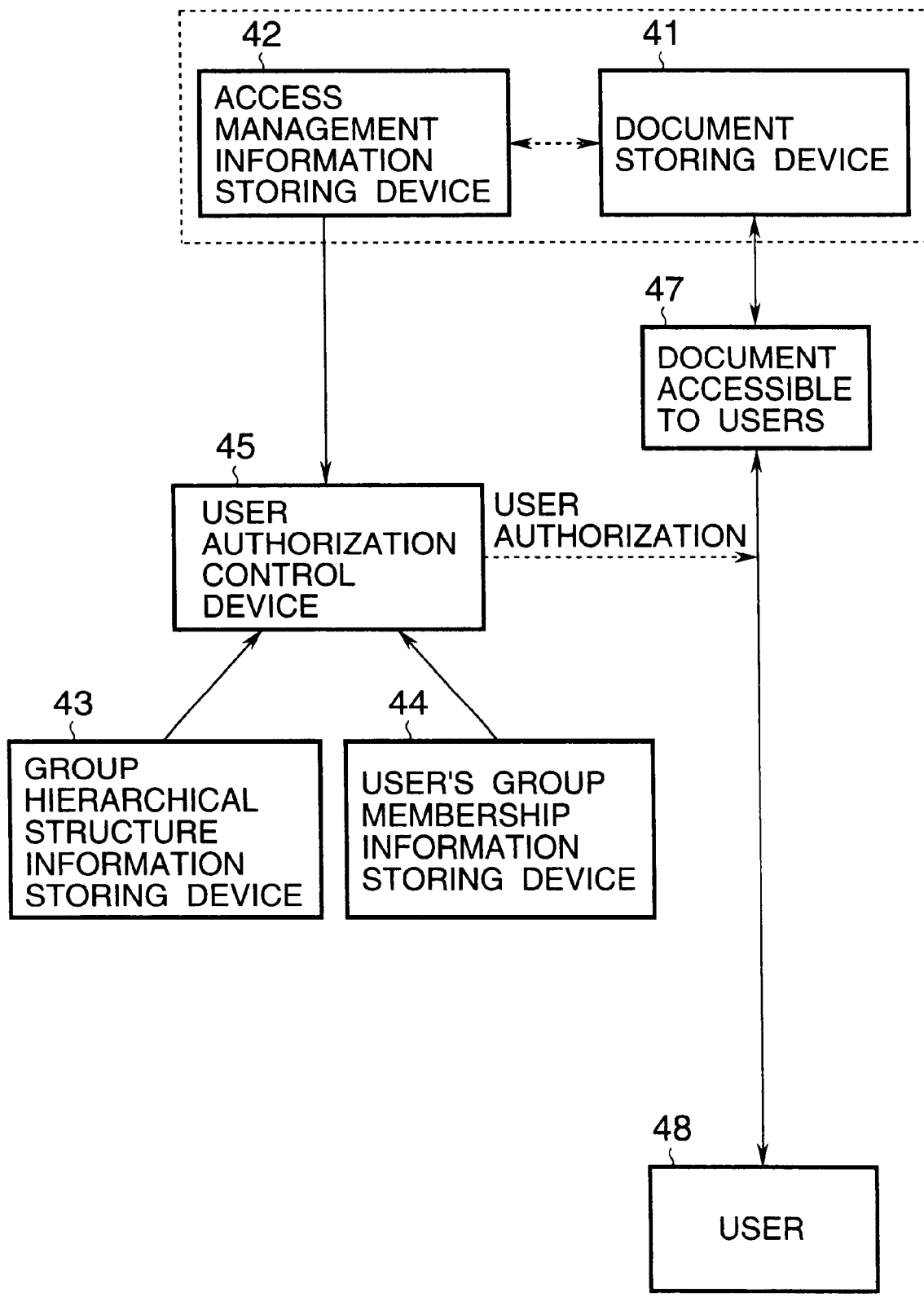
FIG. 4 is a block diagram to show the composition of a document attribute management system whereby selection of users is achieved.

The document access managing portion 135 comprises components to activate the hierarchical structure information storing device 43, user belonging group management information storing device 44, and user selection management device 45 to execute their respective functions as shown in FIG. 4. The document file storage 156 comprises components to activate the document storing device 41 and access management information storing device 42 to execute their respective functions.

Management of users and groups in this embodiment will be described below. In this embodiment, permission of access to a database is given in terms of groups and not in persons.

The general principle of access management of this embodiment is to limit users to access document by limiting users to access the general document managing portion 123 on the basis of account management. The involved database basically consists of business documents, and thus access management is applied in terms of user groups, not in persons. From the side of users, once their group is permitted to access to a database, they have the same right in access to the database.

The first procedure necessary for access management is to divide the users into groups, and to define access right to documents for respective groups with regard to each operation.

The group management principle in this embodiment is to build a hierarchical structure from the groups reflecting their business activities, and assign appropriate operations to the groups according to their positions in the structure.

This embodiment, to execute the document access management, defines individual users as the minimum unit to be managed. This is because it must record individual accesses in an access log. Further, every user is assigned to one group. Such a group is called a primary group. A user may be assigned to other groups called "additional," which are also given the same right to access to the database with that given to the primary group.

Those groups are positioned in tree-like structures which may count any number. A group has one or no group on the layer just above it. With the groups being arranged as described above, the right to access is automatically given to the upper/lower groups on the tree, and is left to distribute among them. In this manner, access to a database for operations is managed similarly for access to a database for viewing.

Before a document is registered into a database, or a document retrieved from a database is distributed, it must undergo a general document/confidential document selecting process. In this embodiment, distribution of a document is to confer the right of access to that document to the group to be distributed. Giving the right of access to a document to a group may be noticed in a separate mail, or the mail may be automatically dispatched.

When a user registers or distributes a document, the right of access to the document is automatically given to the groups direct above the user group. The right of access to the document for viewing is automatically given to the groups below the user, only when that document is a general document.

Management of document distribution in this embodiment will be given below. In this embodiment, distribution of a document refers to granting the right of access to the document for viewing to users. Management of document distribution consists of checking whether distribution of documents is practiced according to specified regulations, and the right of access to a given document is given only to right groups and prohibited against wrong groups.

According to the general principle applied for the document distribution management of this embodiment, the right of access to documents for updating is assigned only to the owner group, and access to documents for viewing is flexibly assigned to users for each document, not being limited to the group structure.

The document distribution management according to this embodiment will be more concretely outlined below. Only one owner group is implemented for each document that is responsible for its management. The right of access to a document for updating its content or its attributes is assigned only to the owner group. The owner group has the right of access, too. All the operations applicable to a document are registered in an operation master.

In this embodiment, distribution of a document means giving, the right of access to the document and its attributes for viewing. The owner group can implement permission the right of access for viewing to each document. The owner group gives permission to view the document for arbitrary group.

For the document distributed as above, manager for distributed group checks the distribution. This checking action is called receipt in this embodiment. Delivery and receipt of a document are recorded in a distribution log.

This embodiment also allows documents to be distributed outside the closed network. This out-of-network distribution is to distribute a document controlled by this embodiment to an outsider, for example, a subcontractor outside the close network. The out-of-network distribution is also recorded in the distribution log. Distribution of actual documents by mail may occur as such.

Operation of this embodiment will be given below.

Figure 48:
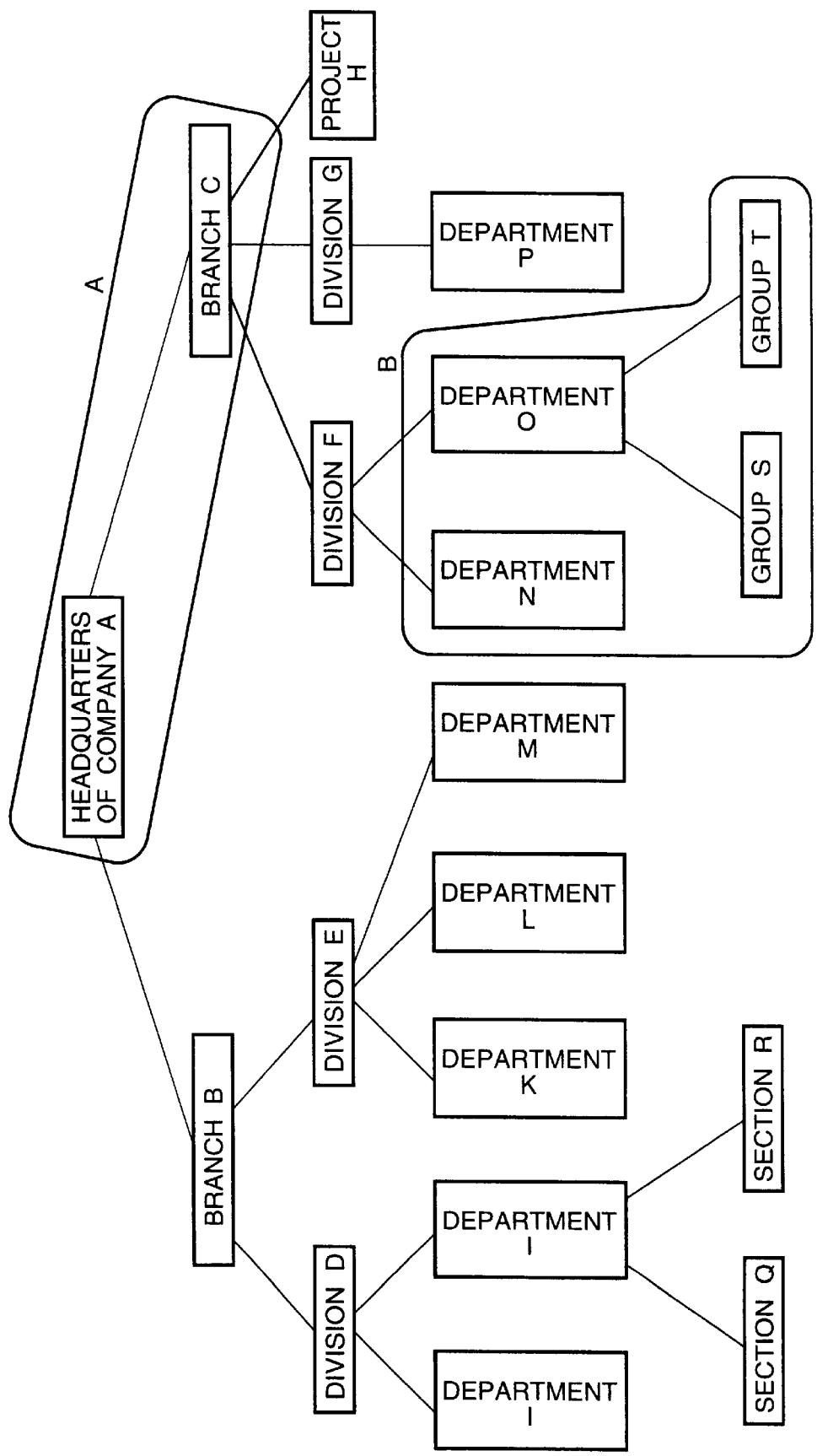
FIG. 48 is a hierarchical structure of groups adopted by the embodiment.

FIG. 48 shows a diagram representing the group hierarchy structure of this embodiment.

As shown in this figure, a hierarchical structure of "groups" is firstly defined. Then, every user is assigned to a group. Access management is practiced in terms of groups.

In this embodiment representing the present invention, the owner group is implemented for each document, and the former is stored with the latter. Every document has its "owner group."

In this embodiment, distribution of a document to a group is to confer the right of access to that document to the group. Distribution of a document starts through the "distribution" operation taken by the owner group, and proceeds to other user groups, giving the right of access to those groups.

Figure 49:
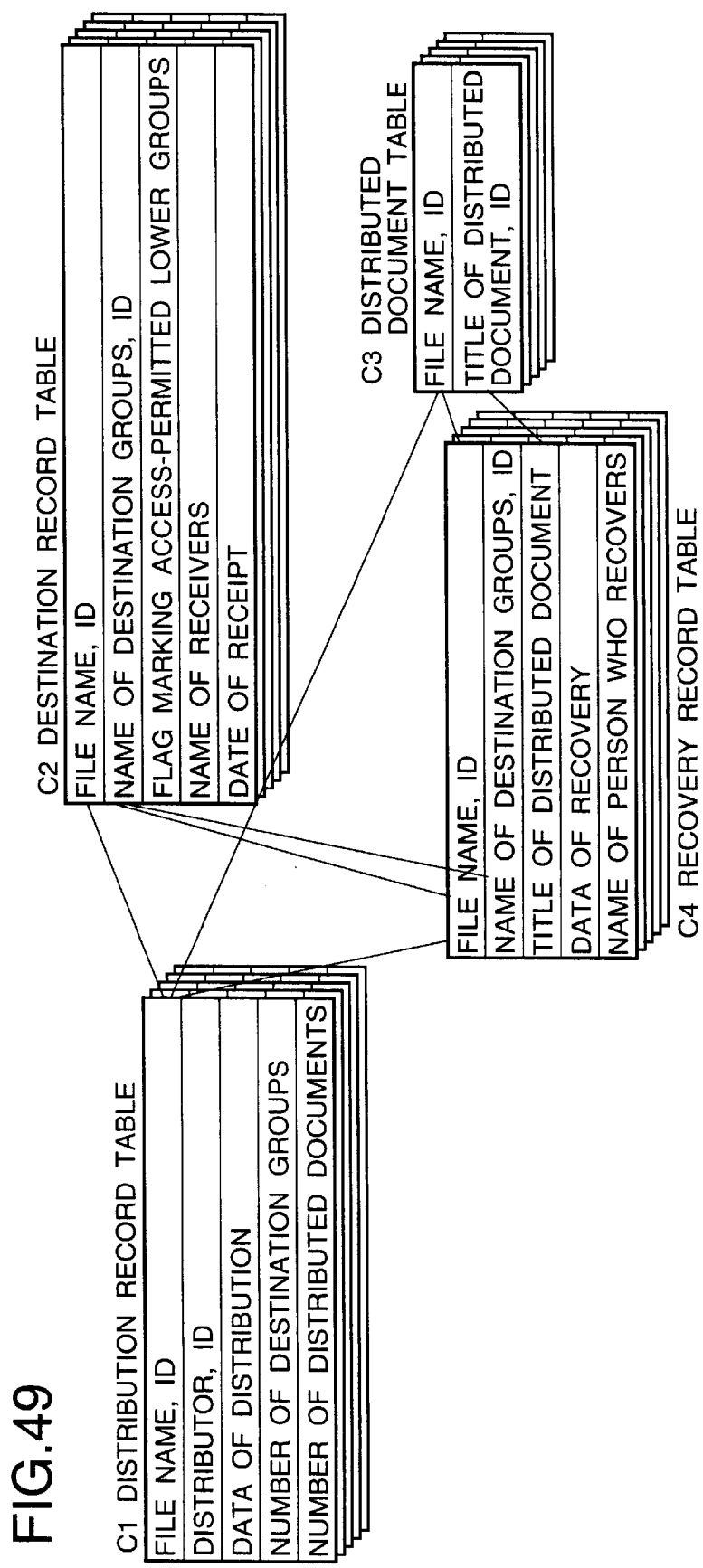
FIG. 49 is a data composition chart to show the structure of component databases for the data of distribution of documents implemented in a database of the embodiment.

FIG. 49 shows the composition of data arranged in a database 150 for recording distribution of document.

In this embodiment, distribution of documents takes place by specifying a plurality of documents and distributing them to a plurality of groups. Each time distribution occurs, a group of distribution logs such as records C1 to C4 is stored in the database. Each of these distribution logs includes records of appropriate table, and these records may be compared with each other through ID and a handled item.

In distribution of a document, one record is added in a distribution record table C1 of FIG. 49. This record is added each time distribution of a document is made. Whenever a document to be distributed has been implemented, a record is added in a document distribution table C3.

When the document is recovered, it is still stored in the document file storage 156, however the group from which the document has been recovered is deprived of the right of access to the document. The renewed distribution of access right after a document has been recovered is achieved by adding a record to a document recovery recording table C4.

Selection of groups to which a document is to be distributed is achieved by adding a record to a distribution group table C2 of FIG. 49.

When a group has a document distributed, the right of access to the document is automatically given to the groups above the group. For example, if division F of FIG. 48 receives a document, the right of access to the document is automatically given to the groups enclosed by range A.

For groups below the group receiving the document, the access right to the document may be determined separately one by one for each group. For example, if division F receives a document, the access right to the document is determined separately for each one of the groups enclosed by range B.

In this embodiment, it is checked whether a group to which a document is distributed actually receives it or not. A user of the group to which a document is distributed, when he receives the document, makes a receipt operation, to register a receipt mark into a distribution log.

As described above, this embodiment effectively incorporates the present invention. The embodiment allows flexible selection of users who are permitted to view or handle to each document according to the current state of business. The embodiment further allows flexible and effective designation and setting for the right of access to a document according to the current state of business.

As discussed above, it is possible with this second embodiment to build a database which may have various data structures, by only implementing definition tables and not preparing any new programs for those structures, thereby to reduce the time, labor and cost required for the preparation of such programs, and to relieve the database builder of technical knowledge usually required for such database construction.

Next, description will be given, for a third example of the first embodiment, of a procedure for a user to register a complex data type, which are constructed only by elementary data types permitted to the user, using the elementary data type/owner relation table as shown in FIG. 34.

The complex data types derived only from elementary data types permitted to the user can be registered, by simply inserting the above procedure before the step 202 for registering a complex data type of FIG. 13. Description will be given for a case where the user is permitted to access to data of an elementary data type identified by the elementary data type ID of record of an elementary data type/owner relation table where his user ID is recorded, or data of an elementary data type identified by the elementary data type ID of record where the group IDs below the user group in a hierarchical structure as shown in FIG. 33 are entered. It is also possible to determine accessible elementary data types by other methods capable of being described in a language compatible with a hierarchical structure.

FIG. 50 shows an example of display screen giving a list of accessible elementary data types through which a user can select an elementary data type to thereby obtain desired complex data types. FIGS. 51 and 52 show a program to define the above display screen. The program contains the IDs of elementary data types and their characteristic names for each element of the list. By displaying characteristic names, and specifying them with a pointing device such as mouse, the system enters those IDs of elementary data types in another display, in this case, in a display for recording the elementary data types included in the complex data types to be registered.

Figure 53:
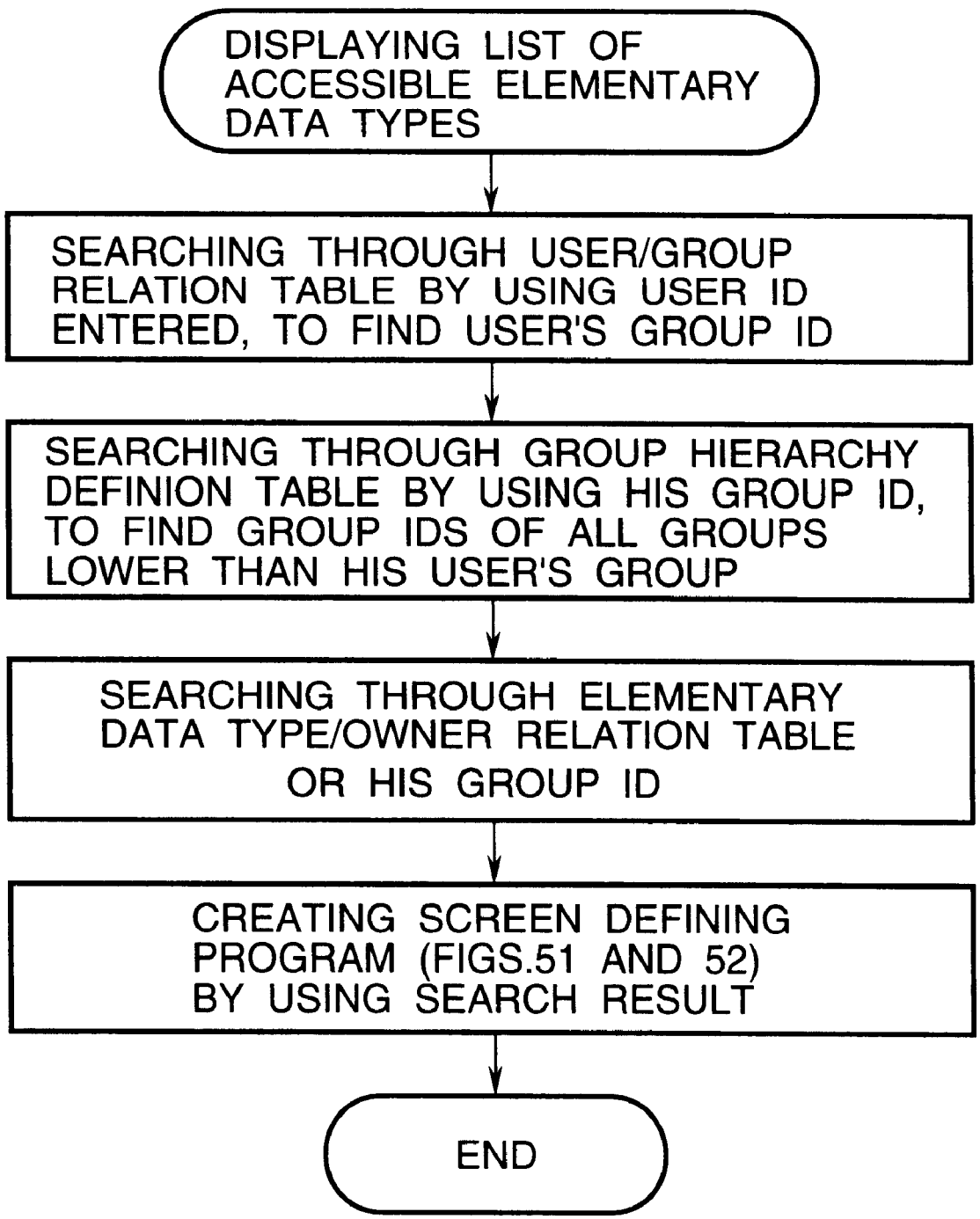
FIG. 53 is a flow chart to show the handling steps of a display function program to create the above screen defining program.

FIG. 53 shows a flow chart of the steps of a display function program necessary for creating the screen defining program of FIGS. 51 and 52. Input is the user ID. Firstly, the user searches for his user ID through a user/group relation table as shown in FIG. 31, and knows the group ID to which he belongs. Then, using his group ID, he searches through a group hierarchy definition table as shown in FIG. 32, and finds all groups below his group. Then, he refers to an elementary data/owner relation table of FIG. 34, by using OR conditions of his user ID, group ID, IDs of lower groups, or a blank space. The blank space means no limitation being given to the access right. Then access-permitted IDs of elementary data types are obtained. Finally, the screen defining program is created based on those data.

Next, description will be given of a procedure for a user to register a complex data, to choose the authorized complex data types using the complex data type/owner relation table as shown in FIG. 34. It is possible to allow the user to specify an accessible complex data, thereby to register the complex data, by simply inserting the above procedure before the step 203 for displaying complex data types of FIG. 13.

Description will be given for a case where the user is permitted to access to data of a complex data type identified by the complex data type ID of record of a complex data type/owner relation table where his user ID is recorded, or data of a complex data type identified by the complex data type ID of record, where the group IDs below his user group in a hierarchical structure as shown in FIG. 33, are entered. It is also possible to determine accessible complex data types by other methods capable of being described in a language compatible with a hierarchical structure.

FIG. 54 shows an example of display giving a list of accessible complex data types through which a user can select a desired complex data type. FIGS. 55 and 56 show a program to define the above display. The program contains the IDs of complex data types and their characteristic names for each element of the list. By displaying characteristic names, and specifying them with a pointing device such as mouse, the system executes, using the IDs of complex data types as a parameter, a display function program to evoke a complex data entry prompting display as shown in FIG. 16.

Figure 57:
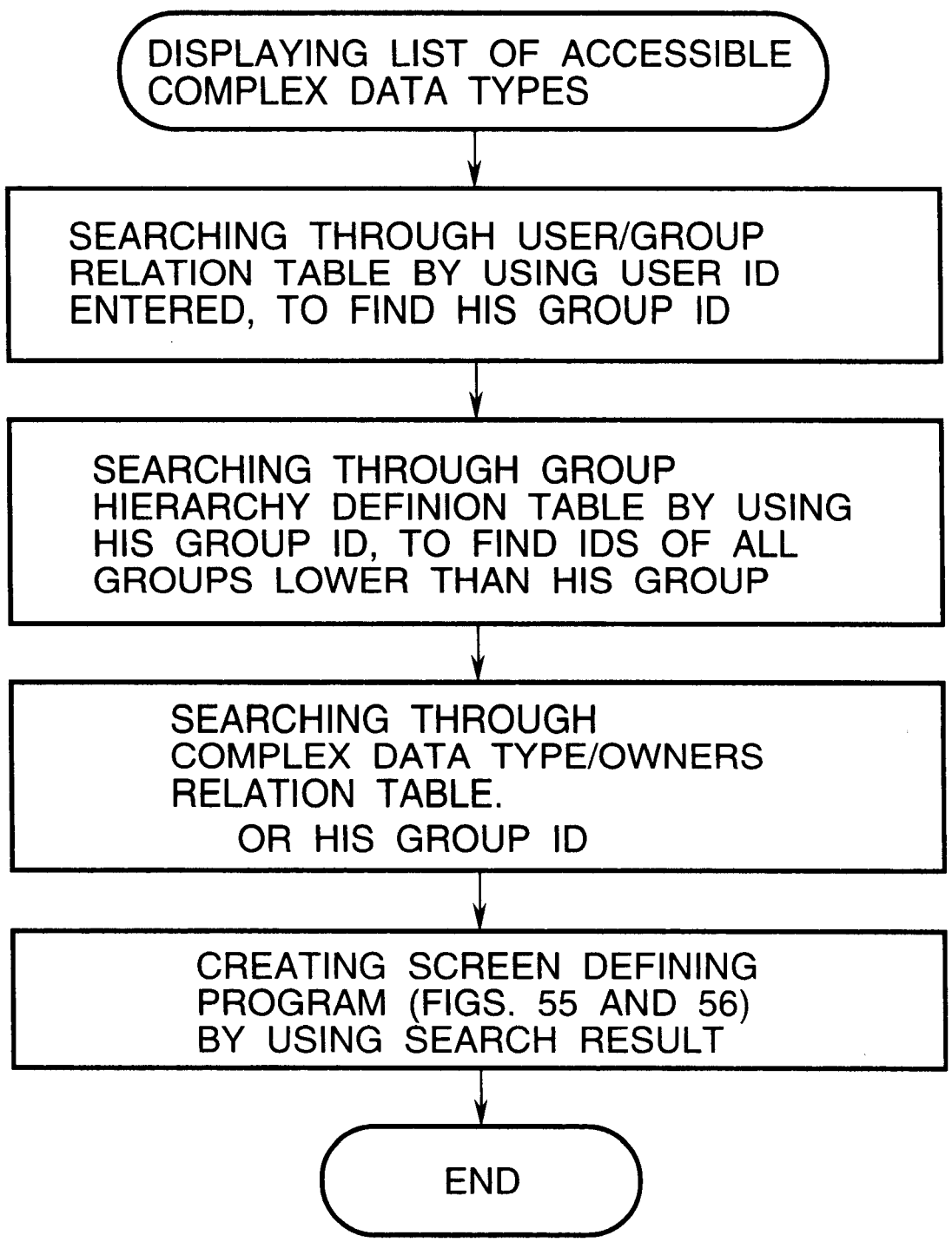
FIG. 57 is a flow chart to show the handling steps of a display function program to create the above screen defining program.

FIG. 57 shows a flow chart of the steps of a display function program necessary for creating the screen defining program of FIGS. 55 and 56. Input is the user ID. Firstly, the user searches for his user ID through a user/group relation table as shown in FIG. 31, and knows his group ID to which he belongs. Then, using his group ID, he searches through a group hierarchy definition table as shown in FIG. 32, and finds all groups below his group. Then, he refers to a complex data/owner relation table of FIG. 34, by using OR conditions of his user ID, group ID, IDs of lower groups, or a blank space. The blank space means no limitation being imposed to the access right. Then access-permitted IDs of complex data types are obtained. Finally, the screen defining program is created based on those data.

As discussed above, it is possible with this embodiment to build a database which may have various data structures, by only implementing a number of definition tables and not preparing any new programs for those structures, thereby to reduce the time, labor and cost required for the preparation of such programs, and to relieve the database builder of technical knowledge usually required for such database construction.

It should be apparent to those skilled in the art that the above-described embodiments are merely illustrative which represent the application of the principles of the present invention. Numerous and varied other arrangements can be readily devised by those skilled in the art without departing from the spirit and the scope of the invention.

What is claimed is:

1. A database access method to deliver and store information from and in a database in response to instructions through access from a plurality of users, wherein:

making elementary data type definitions to define types of various data to be collected in the database at least by data category and name in accordance with data structure wherein single data constituting the database or their clusters are made elements, data masses each comprising at least one element being prepared;

making complex data type definitions as a mass of said elementary data type definitions, making definition of each of various data masses available to users by specifying an appropriate complex data type previously defined and adding its ID code to the data mass;

feeding individual data into the database by preserving an area in a storage space of the database for each elementary data type, and storing data in a corresponding area together with the ID code of the data mass; and accessing to individual data in the database by specifying the ID code of data mass and the definition of the complex data type.

2. A database access method as described in claim 1 wherein:

the database information comprises electronically stored documents; and the complex data type definitions are a stored assembly of format documents to serve as a model during document preparation, accompanied with typical attributes to be attached to a prepared document, and document-related information files;

in preparing a document, selecting any one from the format documents, and preparing a desired document according to selected document, and storing the prepared document together with values of attributes contained in the assembly which must be given before storage, and supplementary attributes and their values added as needed.

3. A database access method as described in claim 1 wherein:

storing information organized in a hierarchical structure like a tree in which a plurality of groups are arranged such that any group has one or less group on the layer just above it;

assigning a user who specifies an elementary data type to give a complex data type definition, or a complex data type to give a data mass definition, without fail to a group; and selecting users accessible to a particular elementary or complex data type by using at least the information of the group hierarchy structure.

4. A database access method as described in claim 3 wherein:

storing an owner group which is responsible for management of each elementary or complex data type;

storing information of groups permitted to access to each elementary or complex data type, or of operations permitted to be applied to each elementary or complex data type; and selecting users who are permitted to view or change a definition of particular elementary or complex data type, or use a particular elementary data type to make definition of a complex data type, or use a particular complex data type to make definition of a data mass, by using at least the information of owner group and of access permitted groups and operations, in addition to the information of the group hierarchy structure.

5. A database access system to deliver and store information from and in a database in response to instructions through access from a plurality of users comprising:

an elementary data type definition table storage for storing elementary data type definitions to define the type of various data collected in a database at least by the data type and characteristic name in accordance with data structure, wherein single data constituting the database or their clusters being made elements, data masses each comprising at least one element being prepared;

a complex data type definition table storage for storing at least ID codes of the complex data types defining the types of various data masses;

a complex/elementary data type relation table storage for storing for each complex data type, its relation with at least one elementary data type, to thereby define a complex data type in terms of elementary data type; and a data mass storage for storing, as long as any one of the complex data types previously defined has been notified and an ID is attached to the data mass, the definitions of various data masses available to users at least on the basis of the notified ID codes of complex data types and ID codes attached to the data masses, wherein:

feeding individual data into the database is achieved by preserving an area in the storage space of the database for each elementary data type, and storing data in the area together with the ID code defining the data mass, and access to individual data in the database is achieved by referring to the complex/elementary data type relation table storage using the ID code of complex data type which is stored in the data mass storage for each data mass, thereby finding the location of the data storage area containing the elementary data type to be accessed, and identifying the data to be accessed using the ID code of data mass for access.

6. A database access system as described in claim 5 further comprising:

a group hierarchy structure defining portion for storing information defined like a tree structure in which a plurality of groups are arranged such that any group has one or less group on the layer just above it;

a user belonging defining portion for setting user's belonging, without fail to a group, every user that specifies an elementary data type to give the definition of a complex data type, or a complex data type to give the definition of a data mass; and a user selecting portion for selecting users who are permitted to access to a particular elementary or complex data type according at least to the information in the group hierarchy structure.

7. A database access system as described in claim 6 further comprising:

an owner group information storage for storing information of the owner group for each elementary or complex data type;

an authorization information storage for storing information of groups permitted to access to an elementary or complex data type, or of operations permitted to be applied to an elementary or complex data type; and a user selecting portion for selecting users who are permitted to view or change a definition of a particular elementary or complex data type, or to use a particular elementary data type to define the complex data type, or to use a particular complex data type to define the data mass, by using at least the information of owner group and of the authorization information, in addition to the information of the group hierarchy structure.

8. A database access system as described in claim 5 wherein:

the elementary data type definition table storage, complex data type definition table storage, and complex/elementary data type relation table storage are integrated in a database server unit; and display function programs are installed in a web server unit to automatically create a screen defining program on the basis of information stored in the elementary data type definition table storage, complex data type definition table storage, and complex/elementary data type relation table storage, the display function program is created as above being installed in the web server unit, and access to individual data in a database is achieved by using the screen defining program.

9. A database access system as described in claim 8 which has a plurality of web server units.

10. A recording medium which records a computer program to control the elementary data type definition table storage, complex data type definition table storage, and elementary/complex data type relation table storage as described in claim 5, and is capable of being read by a computer.

11. A recording medium capable of being read by a computer as described in claim 10 further recording a program capable of activating:

a group hierarchy structure defining portion to store information of a hierarchical structure in which a plurality of groups are organized like a tree such that any group has one or less group on the layer just above it;

a user belonging defining portion to assign, without fail to a group, every user that notifies an elementary data type to give the definition of a complex data type, or a complex data type to give the definition of a data mass; and a user selecting portion to select users permitted to access to a particular elementary or complex data type by using at least the information of the group hierarchy structure.

12. A recording medium capable of being read by a computer as described in claim 11 further recording a program capable of activating:

an original group information storage to store information of the owner group for each elementary or complex data type;

an authorization information storage to store information of groups permitted to access to an elementary or complex data type, or of operations permitted to be applied to an elementary or complex data type; and a user selecting portion to select users who are permitted to view or change definition of a particular elementary or complex data type, or to use a particular elementary data type to define the complex data type, or to use a particular complex data type to define the data mass, by using at least the information of owner group and the authorization information, in addition to the information of the group hierarchy structure.

13. A database access method to deliver and store information from and in a database in response to instructions through access from a plurality of users wherein:

making elementary data type definitions to define type of various data collected in the database at least by data type and name in accordance with data structure wherein single data constituting the database or their clusters being made elements, data masses each comprising at least one element being prepared;

making complex data type definitions as a mass of the elementary data type definitions, making definition of each of various data masses available to users by specifying an appropriate complex data type already defined and adding its ID code to the data mass;

feeding individual data into the database by preserving an area in a storage space of the database for each elementary data type, and storing data in a corresponding area together with the ID code defining the data mass; and searching individual data through the database by describing a search condition through a logic computation based at least on a combination of an elementary data type and its value, and finding a data mass meeting the search condition, regardless of the involved complex data type.

14. A database access system to deliver and store information from and in a database in response to instructions through access from a plurality of users comprising:

a first means to produce elementary data type definitions which define various data collected in the database at least by data type and name in accordance with data structure wherein single data constituting the database or their clusters being made elements, data masses each comprising at least one element being prepared;

a second means to produce complex data type definitions as a mass of the elementary data type definitions, and to define each of various data masses available to users by specifying an appropriate complex data type and adding its ID code to the data mass; and a third means, for feeding individual data into the database, to preserve an area in a storage space of the database for each elementary data type, and to store data in a corresponding area together with the ID code defining the data mass, wherein:

access to individual data in the database is achieved by describing a search condition through a logic computation based at least on a combination of an elementary data type and its value, and finding a data mass meeting the search condition, regardless of the involved complex data type.

15. A recording medium capable of being read by a computer which records a computer program to control the first to third means as described in claim 14.

16. A database access system to deliver and store information from and in a database in response to instructions through access from a plurality of users comprising:

an elementary data type definition table storage for storing elementary data type definitions to define the type of various data collected in a database at least by the data type and characteristic name in accordance with the data structure wherein single data constituting the database or their clusters being made elements, data masses each comprising at least one element being prepared;

a complex data type definition table storage for storing at least the ID codes of complex data types defining the types of various data masses; and a complex/elementary data type relation table storage for storing, for each complex data type, its relation with at least one elementary data type, to thereby define a complex data type in terms of elementary data type; and a data mass storage for storing, as long as any one of the complex data types previously defined has been notified and an ID is attached to the data mass, the definitions of various data masses available to users at least on the basis of the notified ID code of complex data types and an ID code attached to the data masses, wherein:

searching for a data mass through the database is achieved by setting a search condition through a logic computation based at least on a combination of an elementary data type and its value, and referring to the storages for data mass, complex data type definition table, complex/elementary data type relation table, and elementary data type definition table, thereby finding a data mass meeting the search condition, regardless of the involved complex data type.

17. A recording medium capable of being read by a computer which records a computer program to control the storages for data mass, complex data type definition table, complex/elementary data type relation table, and elementary data type definition table as described in claim 16.

* * * * *